United States Patent [19]

Amberg et al.

[11] 4,078,845

[45] Mar. 14, 1978

[54] LIMITED-SLIP BRAKE CONTROL SYSTEM

[75] Inventors: Robert Leo Amberg, Seattle; Narinder Singh Attri, Renton, both of Wash.

[73] Assignee: The Boeing Company, Seattle, Wash.

[21] Appl. No.: 714,425

[22] Filed: Aug. 13, 1976

[51] Int. Cl.$^2$ ............................................. B60T 8/10
[52] U.S. Cl. .................................. 303/107; 244/111; 303/20; 303/106
[58] Field of Search ..................... 188/181; 235/150.2; 244/111; 303/20, 93–112; 317/5; 340/53, 62; 361/238, 242

[56] References Cited

U.S. PATENT DOCUMENTS

| | | | |
|---|---|---|---|
| 3,275,384 | 9/1966 | Hirzel | 303/111 |
| 3,547,501 | 12/1970 | Harned et al. | 303/107 |
| 3,604,762 | 9/1971 | Ando et al. | 303/97 |
| 3,615,120 | 10/1971 | Yamazaki et al. | 303/105 |
| 3,829,167 | 4/1974 | Ruof et al. | 244/111 X |
| 3,850,480 | 11/1974 | Atkins | 303/97 |
| 3,856,365 | 12/1974 | Steigerwald et al. | 303/93 |
| 3,857,612 | 12/1974 | Bynum | 303/105 |
| 3,917,356 | 11/1975 | Deulieg | 303/93 |
| 3,920,278 | 11/1975 | Hirzel et al. | 244/111 X |
| 3,950,036 | 4/1976 | Fink et al. | 303/111 |
| 3,967,862 | 7/1976 | Hunter et al. | 303/103 |

FOREIGN PATENT DOCUMENTS

| | | | |
|---|---|---|---|
| 2,311,820 | 9/1973 | Germany | 303/110 |
| 2,519,141 | 11/1975 | Germany | 303/110 |

Primary Examiner—Stephen G. Kunin

Attorney, Agent, or Firm—H. Gus Hartmann; Bernard A. Donahue

[57] ABSTRACT

A brake control system which limits the operation of the braking forces applied to the tires, to the non-slip portion of the tire brake force and wheel velocity characteristic curve, i.e., the front or positive slope side of the characteristic Mu/slip curve; and thereby, minimizes both tire and brake wear. In particular, two embodiments of the invention are disclosed. All of which contain three aspects: a basic deceleration control circuit; a large deviation control circuit; and an energy balance system. The basic deceleration control circuit produces an average deceleration by summing the decelerations from all of the wheels, through a filtered differentiation of the wheel speed, and dividing it by the number of wheels. The average deceleration is then compared to the pilot selected deceleration rate for Dry, Wet, or Icy conditions and an error signal is generated. This error signal is then applied to a hysteresis circuit which outputs a constant level positive or negative signal. This signal is then integrated and supplied to a valve driver, which will modulate the metered braking pressure applied to the wheel. When the basic deceleration control circuit can no longer maintain braking control, the large deviation control circuit is actuated and generates a second error signal for providing corrective action to recover quickly when the selected deceleration rate is exceeded by a certain predetermined amount. This second error signal is also applied to a time constant circuit from which a controlled duration memory signal is provided that will reduce the brake torque of the wheel to a level consistent with the surface conditions of the runway.

53 Claims, 8 Drawing Figures

$\ddot{X}_A$ = AIRPLANE DECELERATION
$F(\ddot{X}_A)$ = A FUNCTION OF AIRPLANE DECELERATION

LIMITED-SLIP BRAKE CONTROL SYSTEM

SUMMARY OF THE INVENTION

For a better understanding of the limited-slip brake control system of this invention, it is important to understand the distinctions between it and a known conventional anti-skid braking system with and without automatic braking, such as described for example in U.S. Pat. No. 3,669,508, issued June 13, 1972, entitled "Wheelspeed Information Signal Processing System."

In the known conventional anti-skid braking systems without automatic braking, the rate of deceleration is controlled by the pilot; and when the pilot meters full braking pressure, the anti-skid system operates to maximize stopping capability. However, under some circumstances, the tires will be forced to skid; and when they do, the anti-skid system then functions to quickly relieve the skidding by decreasing the braking fluid pressure. With this type of system it is difficult, if not impossible, to achieve a constant rate of deceleration during the stopping operation; and the percent-slip inherently exceeds the desired range of values in which the tire wear is minimized and the steering control optimized.

In the known conventional anti-skid braking systems with automatic braking, the rate of deceleration is held constant by the system; and it is not necessary that the pilot use the brake pedals except to override the automatic braking. The anti-skid portion of the system functions under certain operating conditions; particularly, when momentary wheel lockups occur.

In the limited-slip brake control system of this invention, the selected rate of airplane deceleration is held relatively constant and the braking system is actuated and operated by the pilot using the brake pedals. This system functions to prevent skids from occurring, as opposed to relieving them as rapidly as possible, as the known conventional anti-skid braking system. In order for the system of this invention to function properly, it will be necessary to predetermine the percent-slip range within which the wheels are to operate so that adequate stopping capability is achieved without the wheels constantly going into and being rescued from skids. This can be done by analysis, design, and testing of the type of tires to be used and should also take into account the physical factors of the tires; such as, tire size, rolling radius variation during braking, tire to ground friction factors, and further include the airplane characteristics. With these results, the full range of values for the percent-slip range of that particular airplane can be determined and the system can then be made to operate in that particular range. However, under some usage conditions, the full range of the percent-slip will not be usable because of low friction conditions of the runway surface; and under these conditions, the pilot can readjust the reference deceleration rate signal downward, to take into account the decreased ground friction operating conditions. The braking system of this invention is designed to automatically adjust the selected or reference deceleration rate signal downward, if the ground operating conditions will not permit achieving the selected rate of deceleration. This is done by providing a Large Deviation Control Circuit as hereinafter described. Further, since the brakes in the system of this invention are controlled to maintain a given rate of deceleration, and a non-braking wheel will decelerate at the same rate as the braking wheel, it is possible for the braking workload to be unevenly divided between the wheels. This could have serious results, including directional control influences and uneven tire and brake wear. Therefore, several methods are described hereinafter for assuring a reasonably equal workload or sharing of the braking load among the brakes. The fact that a non-working wheel will be turning faster than a working wheel, provides one basis for assuring equal brake workload sharing; i.e., a working or braking wheel turns slower, relative to the speed of the airplane, because the rolling radius of the working wheel is greater. Another basis for assuring a reasonably equal brake workload sharing among the wheels, is based upon the fact that the rate of deceleration of an airplane is related to the available ground friction force by Newton's second law of motion. Although there are other forces which act on the airplane, the available ground friction force or braking force is a dominant force and has the capability of being easily controllable. Therefore, the rate of deceleration of an airplane is an ideal control parameter because it contains the necessary information about the available ground friction braking force, which if properly utilized, will result in a high level of passenger comfort and a good stopping performance.

An object of this invention is to control braking, i.e., to keep the braked wheel speed decrement, from the free rolling wheel speed decrement, in the range in which the wheel decrement is produced by tire deformation and out of the range in which tire slippage on the ground contributes to the wheel decrement; thereby, providing improved steering capability and reduced tire wear.

Another object is to use a deceleration rate signal input as the primary control of the braking system.

Another object is to control the amount of wheel braking so as to produce a rate of deceleration which matches the manually or automatically set value.

Another object is to limit the operation of the braked wheels to the front or positive-slope side of the brake force to wheel velocity curve, or the characteristic tire Mu-slip curve.

The limited-slip brake control system of this invention has several advantages over the current braking systems which incorporate automatic braking. These advantages are possible mainly because this system has been devised from the beginning to do everything that a conventional system would do, plus operate mostly in the beneficial slip range. Whereas, the conventional system evolved as a series of add-ons to the basic hydraulic braking system.

An advantage of this invention is that it provides an optimum passenger comfort level, relative to the average rate of deceleration, by the gradual onset and release of the braking force and by maintaining a constant and smoothly modulated deceleration.

Another advantage is that it relieves the pilot's workload and skill requirements, particularly during combined steering and braking, by optimizing ground control qualities in terms of achieving as much wheel braking as possible under existing conditions, without jeopardizing directional steering control.

Another advantage is that the system automatically adjusts the upper limit of angular velocity difference between the braking wheel and the free-rolling wheel, so as to operate the tire where there is no actual slippage between a tire and the ground.

Another advantage is that the pilot can take full control of the brakes without shutting off the automatic braking system.

Another advantage is the improved operational economics of the airplane in terms of: reduced tire wear; reduced brake wear; and a more simplified and reliable braking system.

DETAILED DESCRIPTION OF THE DRAWINGS

Figure 1:
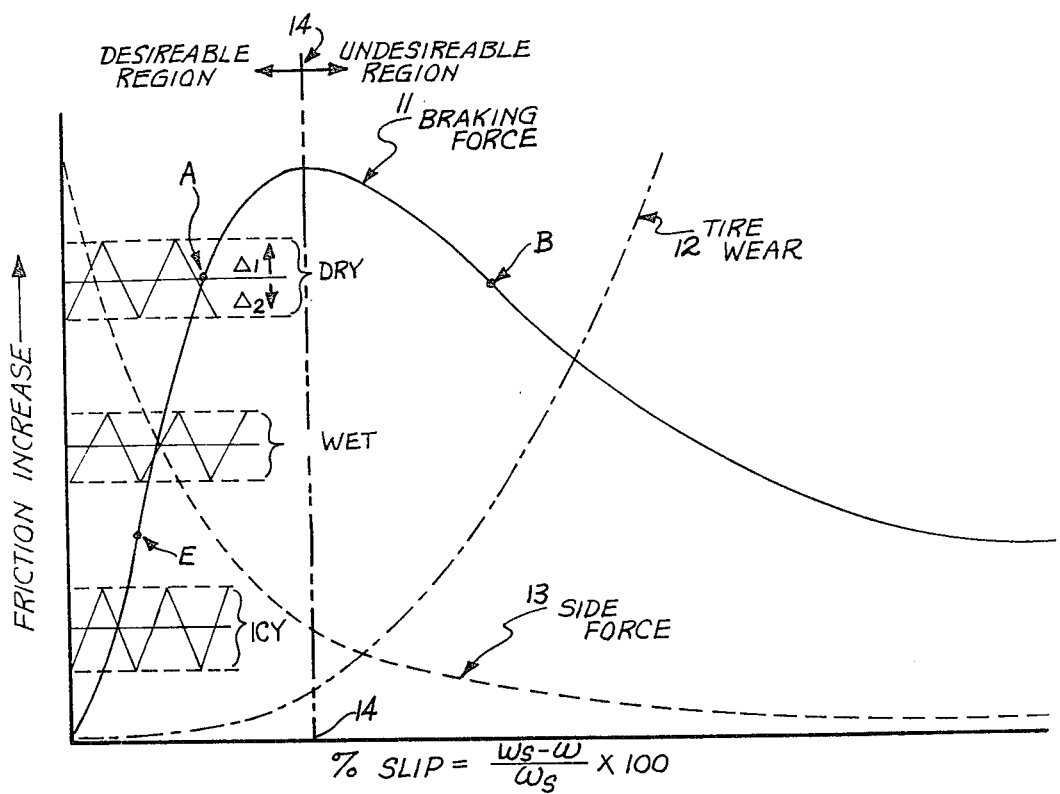
FIG. 1 is a characteristic tire coefficient of friction graph depicting by three curves the relationship of the braking force, the tire side force and the tire wear to the percentage of slip of the tire.

FIG. 1 is a graph showing the relationship between three curves: a braking force curve 11, in solid line; a tire wear curve 12, in dash-dot line; and a tire cornering or side-force curve 13, in dashed line. These three curves are shown plotted on a characteristic graph of the coefficient of friction (Mu, or $\mu$) between a tire and the ground, relative to the function of percent-slip, or as generally referred to as the Mu/slip curve. The maximum coefficients of friction are achieved (depending on many factors) when the apparent braked wheel speed is a value less than the free rolling speed. The decrease in braked wheel speed is the result of a rolling radius increase caused by the dynamic deformation of the tire, rather than by the slippage between the tire and the ground. This term "percent-slip" is not rigorously accurate. However, it is used because of the difficulty in measuring the relative velocity between the tire footprint and the ground; e.g., if the number of tire revolutions down the runway are multiplied by the deflected radius of the tire, this calculated distance will be somewhat less than the actual distance traveled down the runway. Therefore, a distinction is made between the calculated or measured slip and the actual slippage between the tire footprint and the ground. In the percent-slip equation, shown in FIG. 1, the rotational speed $\omega s$ is calculated for a given radius tire that will equal the actual distance traveled; and from this, the actual measured rotational speed $\omega$ of the tire is subtracted, and this difference is then normalized or put into percent by dividing by the calculated rotational speed $\omega s$ and multiplying by 100. The zero percent-slip value, when the calculations are based on measurements from a wheel speed transducer, occurs at the point of zero braking, as shown in the graph of FIG. 1. There is in fact no actual slippage of the tire footprint relative to the bearing surface of the runway in the percent-slip range, under the positive slope or front-side portion of the braking force curve 11 or Mu/slip curve, or that portion thereof which is shown to the left of the vertical dash-dot-dot line 14. Actual tire slippage doesn't occur at the initial application of the braking force, but would begin somewhat around the peak of the Mu/slip curve, or near the vertical dash-dot-dot line 14. The basic premise being, that for percent-slip below this level, there is no actual tire to ground slippage or tire footprint contact area slippage; however, above this level, the tire does begin to slide relative to the ground. Also, the frictional braking force of Mu is increased, up to a point where the tire starts to slide, and then it begins to decrease as the percent-slip is increased.

With respect to the tire cornering or side-force curve 13: the maximum tire side-force is obtained when there is no braking force being applied and there is zero percent tire slip. The tire side-force decreases fairly rapidly with the application of braking force; and after the peak in the braking force curve is reached, or the tire starts slipping, the side-force curve 13 flattens out to a very low value.

With respect to the tire wear curve 12: initially, the tire wear remains at a fairly low value until the peak of the braking force curve 11 is reached and the tire starts slipping, then the tire wear increases very rapidly.

One of the objects of this invention is to provide an essentially better compromise on these three aspects: tire wear, tire cornering or side-force capability, and braking force; by keeping the operation of the braking system on the front side of the braking force curve 11, so that a fair amount of side-force capability remains with very low tire wear.

The approach used to accomplish these objectives is to limit the rate of deceleration of the airplane to such a level that the tires are operating on the front side of the braking force or Mu/slip curve 11, or to the left of the vertical dash-dot-dot line 14. This is in essence limiting the tire braking force to a level that can be generated without slippage between the ground and the tire.

In general, the well-known detailed apparatus of a braking system (not shown) would comprise: pilot operated brake pedals; metering valves; control system; control valves; brake system hydraulics; and the brakes. In the present system, the pilot would actuate a deceleration rate selector switch and apply pressure to the brake pedals, controlling the metering valves that supply pressure to the brakes through the control valves; and the control valves would then, through the present system, modulate the metered pressure to keep the operation of the tires on the front side of the Mu/slip curve.

In a further modified configuration of the present system, incorporating the fundamental braking apparatus, the actuation of the brake pedals would produce an electrical signal which would control the operational range of the system, rather than the metered brake pressure. The operational range would still be limited to the front side of the Mu/slip curve 11 as in the previously described configuration; however, no metering valves would be required. Differential braking for steering with braking forces would be achieved by making the appropriate pedals control the range of the wheels on respective sides of the airplane.

On the backside or negative slope side of the Mu/slip curve 11, or to the right of the vertical dash-dot-dot line 14, slippage between the tire footprint and the ground does occur. This slippage or skidding results in a rapid increase in tire wear rate as shown by the positive sloping line 12, and a deterioration in the tire's ability to react to a side load as shown by the negative sloping line 13. The generally known type of anti-skid systems, continually force the tire into operation on the backside of the Mu/slip curve 11, or to the right of the vertical line 14, in their continual functional determination to locate the peak of the Mu/slip curve 11.

Figure 2:
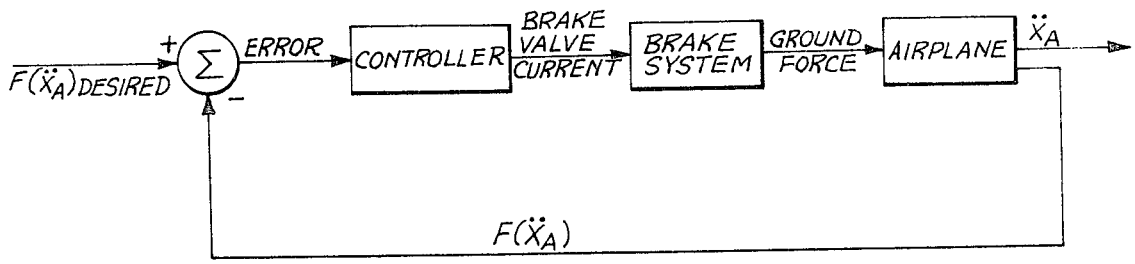
FIG. 2 is a simplified illustration in a functional block diagram of the limited-slip brake control system of the invention.

FIG. 2 is a simplified illustration in block diagram of the braking control system of this invention; wherein, a function of airplane deceleration is measured and compared to a selected value of that function, which will maintain the tire braking force on the front side or positive sloping side of the Mu/slip curve shown in FIG. 1. In general, the system comprises a function of airplane deceleration, $F(Xa)$, which is measured and compared to a selected value of that function; and from a comparison of the function of airplane deceleration, with the desired value of that function, an error signal is generated and fed to the controller. The controller then produces a brake valve current in response to the information contained in the error signal, and this brake valve current then produces the braking force in the wheel brake system. The wheel brake system then produces the brake torque and ground force, that results in the deceleration of the airplane and the function of airplane deceleration. A function of airplane deceleration is indicated, since the actual deceleration of the airplane may not be the most convenient value to measure and use.

Another function that can be used in place of the function of airplane deceleration is the function of wheel deceleration. The wheel deceleration for a non-slipping tire is related to the deceleration of the airplane by the rolling radius of the tire; whereas, the wheel deceleration for a slipping tire is not related to the deceleration of the airplane. This discrepancy can often be used to the system's advantage. Wheel deceleration has the advantage that it can be easily derived from wheel speed information, and it also indicates horizontal deceleration. In contrast, direct airplane deceleration measurement produces a deceleration component referenced to the airplane, which therefore varies with airplane attitude.

Figure 3:
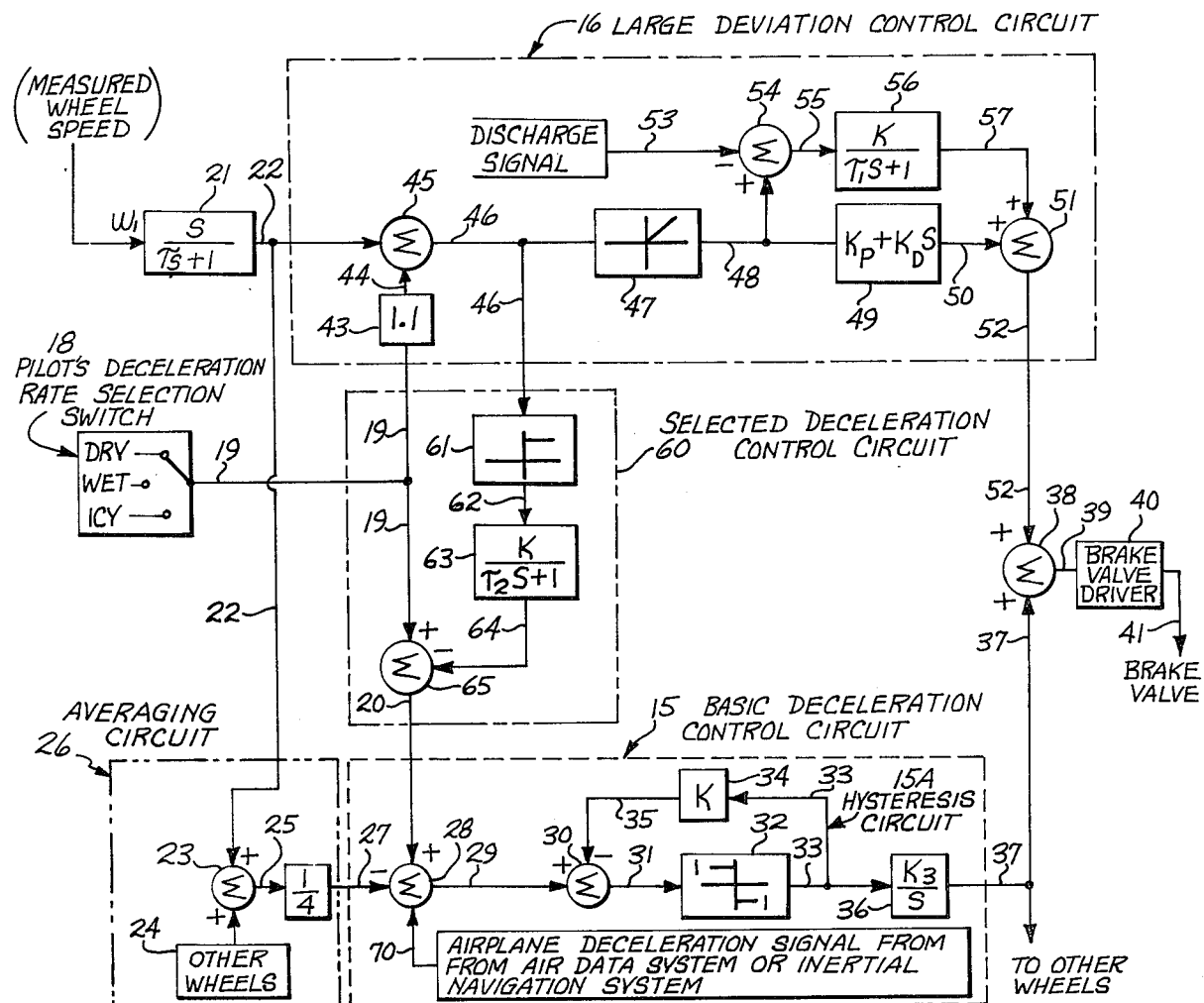
FIG. 3 is a detailed illustration in functional block diagram of the preferred embodiment of the invention depicting three control circuits, i.e., a Basic Deceleration Control, a Large Deviation Control, and a Selected Deceleration Balance Control.

FIG. 3 is a more detailed block diagram of the limited-slip brake control system of this invention and depicts all three circuit system aspects, i.e., Basic Deceleration Control loop circuit 15, Large Deviation Control loop circuit 16, and Energy Balance Control which is provided by supplying the same Deceleration control signal to all of the brakes. FIG. 3, as well as the remaining FIGS. 4 to 6, will be described in combination with the presentation of this invention through these three distinct system aspects.

In general, the Basic Deceleration Control 15 is a primary circuit control loop which maintains the deceleration of the airplane at the required level; the Large Deviation Control 16 is a backup circuit control loop which provides for wheel recovery, should the wheel be forced into a slip condition exceeding the desired limits e.g., a wheel entering an ice path resulting in a sudden drop of the available frictional coefficient or Mu; and the Energy Balance Control is a means of assuring that all of the brakes are doing their share of the work, since the system which is operating on a deceleration basis cannot determine the force causing the deceleration.

More specifically, the Basic Deceleration Control of this invention, which is shown within the dashed outline 15 in FIG. 3, utilizes "across the airplane pairing" of the deceleration control, and this provides a passive energy balance by supplying an essential equal brake valve current to each brake system. The desired rate of deceleration comes from the pilot's selector switch 18, which has three selectable values: Dry, Wet, and Icy. It will be understood, of course, that this could be a multi-position switch or an infinitely variable one. The operation of the braking system on the front side of the Mu/slip curve 11 (shown in FIG. 1) is effected by: the pilot's selection of a deceleration rate value that is low enough to prohibit developing an increase in the coefficient of friction that would drive the system over the critical peak Mu for the existing ground conditions, and by the Large Deviation Control circuitry 16, as described infra, which senses deceleration rates greater than that selected and quickly reduces brake pressure.

Since the location, of the coefficient of friction peak, changes with runway surface conditions, the deceleration rate selector switch 18 is included to allow the pilot to optimize the operation of the braking system to the prevailing runway surface conditions. It is conceivable, that in a more sophisticated braking system, the pilot's selector switch could be replaced by an electrical circuit that would sample the surface frictional conditions of the runway and then automatically set the operational range of the deceleration rate.

The frictional characteristics of the tires on an airplane are such that each has a certain maximum available frictional force, depending upon runway surface conditions, etc., and if all of the available ground friction force is used for braking operation, there will be none left for the side frictional loads on the tire to control steering. This is one of the reasons why the known anti-skid braking systems, which function at the crest of the Mu-slip curve 11 shown in FIG. 1, permit the aircraft to drift off of the runway when braking in a crosswind condition. The peak of the Mu-slip curve 11, or the maximum obtainable rate of deceleration under ideal dry runway surface conditions, would be approximately 12 to 13 fps$^2$ (feet per second squared). However, in order to have a sufficient margin of frictional force in reserve for tire side loads, yaw correction, steering loads, and for passenger comfort, the positioning of the pilot's selector switch 18 to the Dry mark would produce a deceleration rate of approximately 10 fps$^2$; the Wet position would produce a deceleration rate of approximately 7 to 8 fps$^2$; and the Icy position would produce a decleration rate of approximately 5 to 6 fps$^2$.

In all of the figures, the LaPlacian operator S is used to denote $d/dt$. Thus a block with an enclosed S indicates differentiation, and $1/S$ indicates integration. A first order time constant is indicated by $1/\tau S+1$.

In the operation of the braking system, shown in FIG. 3, the pilot positions the deceleration rate selector switch 18 to one of the settings, DRY, WET, or ICY, and this provides a selected deceleration rate signal in line 19 to both: the Large Deviation Control loop 16, shown in dash-dot outline; and to the Basic Deceleration Control loop 15, shown in dashed outline.

The measured wheel rotational velocity signal $\omega_1$ is generally derived from the use of an AC wheelspeed transducer which puts out a sine wave that is squared, and then filtered or rectified to produce a DC voltage that is proportional to the speed of the wheel. The wheelspeed signal $\omega_1$ enters a differentiator 21. In the differentiator block 21, the letter S designates a differentiation, i.e., a derivative with respect to time. For a low frequency sinusoidal signal input $\omega_1$, the output signal 22 will be the differentiation of the sinusoidal signal such that with a sine wave signal input the signal output 22 will be a cosine wave. The expression $S/\tau S+1$ represents a differentiation with a lag circuit; wherein the expression $\tau S+1$ stops or cuts off the differentiation after a certain frequency. This would be equivalent to taking any wave form on the wheel signal $\omega_1$, and then converting it to a Fourier series; and at the higher frequencies, this term $\tau S+1$ functions as filter to attenuate the higher frequencies. So that if there is the presence of noise, like radio frequency interference, this term will function to filter or attenuate it so that it will not feed through the system.

From the differentiator block 21, the output signal 22 which is proportional to the rate of wheel deceleration, goes to both: the Large Deviation Control loop 16 and to the Basic Deceleration Control loop 15.

With respect to the Basic Deceleration Control Circuit 15, the signal 22 enters a summer 23. In the case of a four-wheeled airplane, the wheel signals 24 from the other three wheels would also be summed into the summer 23. The summed signals 25 would enter an averaging circuit block 26 and be divided by the number of wheels on the airplane, which in this case is four, and an average airplane wheel deceleration rate signal 27 will enter the summer 28. Also entering summer 28 is the pilot selected deceleration rate signal 19, 20. In the summer 28, the average airplane wheel deceleration rate signal 27 is compared to the pilot selected deceleration rate signal 19, 20, and a deceleration rate error signal is generated in line 29. This error signal 29 enters a hysteresis circuit loop 15A comprising: a summer 30, a saturated amplifier 32, a gain circuit 34 and an integrator 36. The hysteresis circuit provides a signal 37 to a summer 38 where it is summed with signal 52 from the Large Deviation Control loop 16; and the output signal 39 from the summer 38 is fed to the brake valve driver 40. The signal 39 will cause the brake pressure and the ground deceleration force to increase when the rate of wheel deceleration is low; and to decrease when the rate of wheel deceleration exceeds the selected value. The integrator 36 is essentially the inverse of a differentiator, and the term $K_3$ stands for the gain. The integrator 36 will cause the brake pressure to increase if the rate of airplane deceleration is too low and cause the brake pressure to decrease if it is too high.

The Basic Deceleration Control Circuit 15 functions to adjust the braking pressure and thereby the rate of airplane deceleration, until it satisfies or drives the error signal in line 33 to zero; in which case, the average wheel deceleration rate signal would be equal to the pilot's selected deceleration rate signal, thereby maintaining the rate of airplane deceleration on the front side of the braking force curve 11, shown in FIG. 1. The Basic Deceleration Control Circuit 15 will work fine for pretty much stabilized conditions, but if the aircraft tires happen to hit an ice patch or water puddle on an otherwise dry runway, with the pilot's selector switch set for dry runway braking conditions, this will cause the peak of the braking force curve 11 to be lowered to the point where the tire frictional force may not be able to sustain the applied brake torque and thereby result in the tire going into a skid. Therefore, in order to provide recovery from the skid, the Large Deviation Control Circuit 16 enclosed within the dash-dot outline is utilized. Also, it is conceivable that the Basic Deceleration Control Circuit 15 may not have sufficient authority to maintain the selected deceleration rate and braking control over the wheel, and therefore, the Large Deviation Control Circuit 16 would be necessary. The Large Deviation Control Circuit 16 also receives the wheelspeed signal 22, which enters into the summer 45 where the signal 22 is compared to signal 44 coming from block 43. From block 43, the output signal 44 is slightly greater than the amount of the pilot's selected deceleration rate signal 19 entering block 43, and is shown as approximately 110% thereof. Basically, the Large Deviation Control Circuit 16 controls to this predetermined increase in the selected deceleration rate signal 44, which is shown as approximately 110% of the signal 19. From the summer 45 the deceleration error signal in line 46, or the difference between the input wheel signal 22 and the approximate 110% increased selected deceleration rate signal in line 44, enters the limiter 47.

The graph shown in the limiter block 47, as well as those graphs shown in other blocks in the figures, are of the standard $x, y$ coordinate type; wherein, $x$ is the input and $y$ is the output. The input signal is shown as coming in on the horizontal line, and the output signal is indicated on the vertical line. The upper right quadrant is positive, and the lower left quadrant is negative.

The limiter 47 limits the output signal 48 to positive values, i.e., if the summer 45 output signal 46 is negative, then from the limiter 47 there will be a zero output signal 48; and if the summer 45 output signal 46 is positive, then there will be essentially a one-to-one positive signal output 48. From the summer 45 the output signal 46 will not become positive until the deceleration rate signal 22 from the wheels is a predetermined amount greater than the selected deceleration rate signal 19; i.e., when the signal 22 is greater than 110% of the selected deceleration rate signal 19, or greater than the signal through line 44, then there will be a positive output signal from the limiter 47 into line 48. For example, assuming that the pilot selected on switch 18, a deceleration rate of 10 fps$^2$ (10 feet per second squared). Then, before there would be any signal energy output from the summer 45, there would have to be a signal energy in line 22 equivalent to a wheel deceleration rate greater than 11 fps$^2$.

The output of limiter 47, which is a positive output error signal in line 48, enters block 49 and through line 50 to summer 51. In block 49, the term $Kp$ denotes a constant gain, and the term $K_DS$ denotes a gain $K_D$ times the derivative S of the error signal in line 48. Therefore, the output signal 50 is derived from a constant times the amount that the rate of wheel deceleration is exceeding the value of signal 44, plus a signal that is proportional to a rate of change of that signal. In other words, for example, if the change in the rate of wheel deceleration is rapidly increasing, the $K_DS$ term will produce an output signal 50 which is proportional to that rate of change. Essentially block 49 exaggerates the error signal input in line 48 so as to provide an output signal 50 of a greater signal strength or amount in order to produce a faster rate of change. The output of limiter 47, which is a positive output error signal in line 48, also enters the summer 54 where a predetermined discharge value signal 53 is subtracted from it. From summer 54 the signal 55 enters block 56 which is a lag circuit or essentially a time constant circuit $K/\tau S + 1$. The block 56 functions somewhat like an integrator, in that with a signal input it will cause the signal to be integrated or come up to the signal value that there is on a time constant basis, i.e., an $e^{-T/\tau}$. This circuit 56 provides a controlled duration memory so that if an error signal is developed in line 48, it will be fed into block 56; and the output signal 57 will come up slowly. However, if the error signal in line 48 goes away, which would be equivalent to getting a deceleration rate signal value 22 that would be less than the required signal value of line 44, then there will be an output remaining from block 56 into line 57, that will not disappear as soon as the signal in line 48 disappears. In general, the function of the lag circuit, comprising the summer 54 and block 56, is to provide a signal to the brake valve driver 40 that will cause the brake pressure to remain off for a little while longer than the length of time that the error signal in line 48 exists. The discharge signal input 53 to the summer 54 will control the rate at which the error signal from line 48 decays, in addition to the normal time constant of the circuit in block 56. The signal outputs from blocks 49 and 56 through lines 50 and 57 respectively, are summed in summer 51 and fed through line 52 to summer 38. From summer 38, the signal through line 39 is applied to the brake valve driver 40. When there are signal outputs from blocks 49 and 56, they are applied to the valve driver 40 so that the brake pressure is reduced. Thereby, driving the deceleration rate signal in line 22, down to a value less than the value in signal line 44; in which case, the Basic Deceleration Control Circuit 15 will again assume primary control of the braking operation.

Referring to FIG. 1, during dry runway conditions the pilot would normally select the rate of deceleration at point A on the braking force curve 11, and the Basic Deceleration Control Circuit 15 would then maintain the rate of deceleration of the airplane at the selected position. Although the actual rate of deceleration of the airplane on the braking force curve 11 will vary somewhat due to aerodynamic drag and other forces that operate on the airplane, e.g., if the wheels go through a water puddle or over an ice patch, or something that causes the value of the coefficient of braking friction Mu to decrease, then the airplane deceleration rate will not be able to be maintained at point A. The tire slippage will result in the braking operation moving over the peak of the braking force curve 11 to some point B, on the backside of the braking force curve. In which case, the excess rate of deceleration of the wheel due to tire slippage, will increase the signal in line 22 shown in FIG. 3, thereby causing in the Large Deviation Control Circuit 16, an error signal output in line 48 from block 47. This error signal 48 is fed through blocks 49 and 56, lines 50 and 57 respectively, into summer 51, through line 52 and into summer 38, and through line 39 to the brake valve driver 40. This excess rate of wheel deceleration due to tire slippage, causes the Large Deviation Control Circuit 16 of the braking system to call for less braking pressure; which will cause the operation of the system, referring to FIG. 1, to move back onto the front side of the braking force curve 11, because the braking pressure has been reduced. When the operation of the system moves back on to the front side of the braking force curve, the rate of wheel deceleration, signal 22 in FIG. 3, will become less than that in signal line 44, and the error signal in line 48 will disappear. Now, the brake pressure applied by the valve driver 40 will remain at a lower value, due to the signal output of the lag circuit, until the normal decay of lag circuit 56 causes the brake pressure to come back up. This will then revert the braking control, back to the Basic Deceleration Control Circuit 15.

Figure 3A:
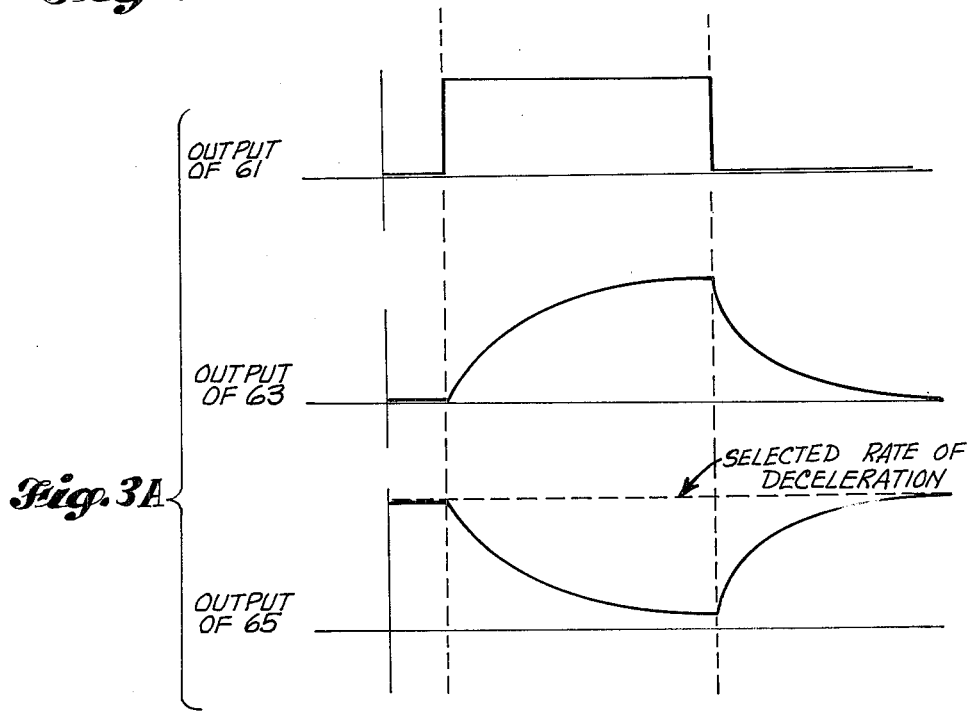
FIG. 3A comprises three graphs depicting the function of the Selected Deceleration Control Circuit shown in FIG. 3.

The function of the Selected Deceleration Control Circuit 60 enclosed within the dash-dot-dot outline, between the Large Deviation Control Circuit 16 and the Basic Deceleration Control Circuit 15, is to accommodate for possible pilot error in selecting a deceleration rate that is greater than the available runway coefficient of friction conditions. In which case, the tires will go into a skid, causing the Large Deviation Control Circuit 16 to be activated. When the wheels begin to skid, the wheel rate of deceleration generates a positive signal in line 22, which exceeds the predetermined increase in the value of the pilot's selected deceleration rate signal in line 44; and which is then subtracted from it in summer 45 so that a deceleration rate error signal of positive sign in line 46 is produced out of summer 45. With a positive sign signal 46 input into the Selected Deceleration Control Circuit 60 and into block 61, a step output signal 62 as shown in the upper graph of FIG. 3A will be fed to a time constant or lag circuit 63. This circuit 63 provides a controlled duration memory which will reduce the brake torque of the wheel to a level consistant with the runway condition. In lag circuit 63, the step input signal 62 will produce an output signal 64 that will increase exponentially on the basis of $\tau$, to the value of the input signal 62 as shown in the center graph of FIG. 3A; and if the step input signal 62 goes away to a zero or a minus value, the output signal 64 value will decay exponentially back to a zero value. The output signal 64 goes to summer 65 and functions to lower the selected deceleration rate signal value coming into the summer from line 19; i.e., the output signal 64 from time constant or lag circuit 63 is subtracted from the selected deceleration rate signal in line 19 in summer 65 in order to reduce the pilot's selected deceleration rate signal to a value more closely matching the runway operating conditions as shown in the lower graph of FIG. 3A. The output of summer 65 in line 20 is compared in the summer 28 with the signal in line 27; in order to produce the error signal in line 29. The Selected Deceleration Control Circuit 60 has the net effect of reducing the signal level that is being compared in the summer 28 with the signal in line 27 and then bringing it back to the level that the pilot has selected in switch 18. This can be more clearly seen in FIG. 3A when the step output signal from block 61 has disappeared, the lag circuit 63 output signal will return to zero, and the summation of signals, 19 and 64 in summer 65, that are transmitted through line 20 to the summer 28, will begin to increase back up to the value that the pilot had selected in switch 18. Therefore, if the pilot selects a rate of deceleration that is too high, the circuit of loop 60 in the system will function to adjust the selected rate of wheel deceleration downward to a level according to prevailing conditions or that the tires can sustain without slippage. At some point, if the operating conditions continue poorer than the system is set for, another second signal will be generated and the cycle will repeat. Without the Selected Deceleration Control Circuit 60 interconnecting the Large Deviation Control loop 16 with that of the Basic Deceleration Control loop 15, the Large Deviation Control Circuit 16 would cycle rapidly; thereby, keeping the deceleration rate lower than necessary and detracting from the overall efficiency of the system.

With the Selected Deceleration Control Circuit 60 included in the system, the pilot's deceleration selector switch 18 could be eliminated; however, there are some advantages in retaining it. With the selector switch 18 left in the Dry position at all times, at the start of braking, the system would adjust to the prevailing runway surface conditions within a few cycles of the Large Deviation Control Circuit 16; and this would sacrifice some stopping time and distance. Therefore, it would be advisable, whenever stopping distance was critical, for the pilot to select as accurately as possible the prevailing ground surface conditions and thereby the rate of deceleration, prior to touchdown. In any case, the percent-slip is kept within the range, thus providing optimum steering capability and reduced tire wear that are both due to the limited-slip function.

With respect to FIG. 3, although four wheels are summed in summer 23, it will be understood that the Basic Deceleration Control Circuit 15 could be operated without averaging the wheel deceleration rate and deleting summer 23 and block 26; and then the system would function on an individual wheel control basis, utilizing a pressure balance or energy balance system interposed for maintaining equal pressure or equal braking torque on all of the wheels.

Also, the system as shown in FIG. 3, utilizes wheel rotational velocity as an input signal $\omega_1$ which is converted in differentiator 21 to a wheel rotational deceleration rate signal in line 22; however, another source for an input signal to the Basic Deceleration Control Circuit 15 could be from an Air Data System or an Inertial Navigation System, and if used, would be an input signal through line 70 coupled with the deletion of the circuit comprising line 22, summer 23, and block 26.

Basically, it is desirable to control the rate of airplane deceleration; therefore, if there were an airplane deceleration input signal in line 70 to the summer 28, from an Air Data System or an Inertial Navagation System, it could be utilized as the controlling parameter instead of the input signal in line 27 relating to the rotational velocity of the wheels.

In FIG. 3, the Basic Deceleration Control Circuit 15 includes a hysteresis circuit 15A in heavy outline comprising: summer 30, saturated amplifier 32, and a gain circuit 34. This hysteresis circuit operates as a deceleration rate limit searching circuit system; wherein, the object or function of the circuit 15A is to make the wheel increase its rate of deceleration, above the pilot's selected deceleration rate in order to insure that the wheel is carrying its share of the braking force load. The signal inputs to this circuit 15A are: the measured wheel rotational velocity signal $\omega_1$ which is put through the lagged differentiator block 21 to become the wheel deceleration rate signal in line 22; and the pilot's selected deceleration rate signal through line 19. These two input signals, 19 and 22, enter the summer 28. In the summer 28, the negative sign wheel deceleration rate signal 22, which is now 27, is algebraically summed with the positive sign, selected deceleration rate signal 19, which is now 20; and the difference produces an error signal output in line 29 which enters the summer 30. Also entering summer 30 is a signal 35 which is a percentage of the output 33 of the hysteresis circuit 15A; and this signal 35 is algebraically summed with the signal 29 in the summer 30, and the difference produces an error signal output in line 31 which is transmitted to the saturated amplifier block 32.

If the input signal 31 to the saturated amplifier block 32 is of a positive sign, then there will be a step-negative output signal 33; and if the input signal to 32 is of a low value or of a negative sign, then there will be a step-positive output signal 33.

The signal 33 leaving the saturated amplifier block 32 is of a constant level; that is, either of a low negative value for a positive input signal 31, or of a high positive value for a negative input signal 31.

The output signal on line 33 of the hysteresis circuit 15A enters the integrator circuit block 36 where it is integrated and produces an output signal 37 which changes at a rate proportional to the amplitude of the input signal 33; and its sign is in the direction determined by the sign of the input signal 33. From the integrator 36, the signal in line 37 enters the summer 38 and then through line 39 to the brake valve driver 40 of the braking wheel (not shown).

Figure 4:
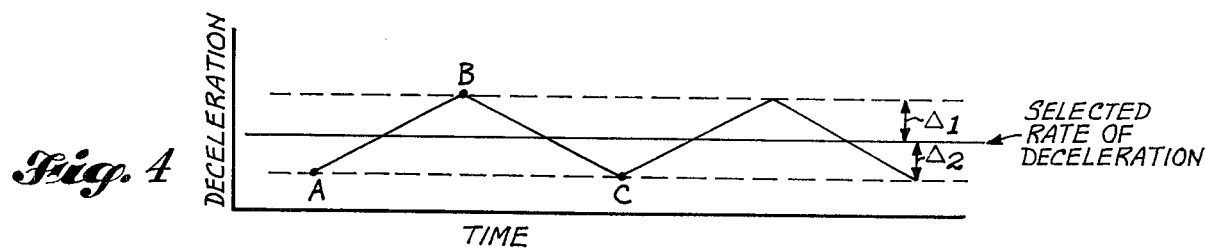
FIG. 4 shows a triangular wave form produced from a plot of the time history of the hysteresis circuit shown in FIG. 3.

Since the step-output signal 33 from the saturated amplifier block 32 is either a plus or a minus voltage signal of a constant amplitude, there will be a constant rate output from the integrator 36 into signal line 37 to the valve driver 40; and in a sense, the constant rate output of an increasing or decreasing deceleration, working around the loop in the hysteresis circuit 15A, produces the triangular wave form shown in FIG. 4. A signal 37 which is going negative, leaving the integrator 36, produces an increase in the braking pressure, which results in an increase in the rate of wheel deceleration; i.e., along the positive slope side of the Mu/slip curve shown in FIG. 1, or on the positive slope side of the graph lines shown in FIG. 4. Likewise, a signal 37 which is going positive, leaving the integrator 36, produces a decrease in the braking pressure with a corresponding decrease in the rate of wheel deceleration, or on the negative slope side of the graph lines shown in FIG. 4.

Part of the saturated amplifier block 32 output signal 33 is fed back to summer 30 through the attenuator or gain circuit block 34. Should the signal leaving block 34 be negative, then the signal entering the summer 30 will have a negative value; and this negative value, when summed in summer 30 with a positive value rate of deceleration error signal 29, will produce a greater strength positive signal 31 leaving summer 30, thereby continuing to produce a constant strength step-negative output signal 33 for an increased braking force. In order to get the saturated amplifier block 32 to switch to a step-positive output signal 33 to decrease the braking force, the measured wheel deceleration rate input signal 27 entering the summer 28 must increase until it exceeds the selected rate of deceleration signal 19, 20, by an amount $\Delta_1$, as shown in FIG. 4, which is equal to the signal strength level in line 35 that is determined by the value of the constant K in block 34. When the braking force is increased so that the amount of the measured wheel deceleration rate signal 27 does exceed the sum of the signal amounts in lines 20 and 35, the summer 30 will then produce an error output signal 31 of a negative sign. This negative error signal 31, when fed into the saturated amplifier block 32, will produce a constant strength step-positive output signal 33; and a part of this signal 33 is fed back to the summer 30. Now, the signal 35 entering the summer 30 is positive, and is therefore subtracted in summer 30 from the signal on line 29 which is the summation of the selected deceleration rate signal 19 and the measured wheel deceleration rate signal 22; whereby, the measured wheel deceleration rate signal 22 now has to be less than the selected deceleration rate signal 19 by an amount $\Delta_2$, or by the amount equal to the gain constant K times the amplitude of the negative signal out of block 34, in order for the braking force on the wheel to be increased. The amount of signal feedback to summer 30 through line 35, is approximately 10% of the selected deceleration rate signal 19; e.g., assume that the selected deceleration rate signal 19 is equal to 10 $fps^2$, then in FIG. 4, $\Delta_1$ and $\Delta_2$ would each be equal to 1 $fps^2$. The following description of operation of the hysteresis circuit system 15A shown in FIG. 3 will be more clearly understood when considered along with FIG. 4. Beginning with the following assumptions: that the measured wheel deceleration rate signal on line 22 is zero; that the selected deceleration rate signal on line 19 is 10 $fps^2$; that the high level of the saturated amplifier block 32 is +1 and the low level −1; and that the gain constant factor K in block 34 is equal to 1 $fps^2$. In summer 28 with a measured wheel deceleration rate signal input on line 27 of zero, and a selected deceleration rate signal on line 20 of 10 $fps^2$, then the output from summer 28 will be of a positive signal 29 into summer 30. From summer 30 a positive output signal 31 will enter the saturated amplifier block 32 to produce both: a constant strength negative signal to the integrator 36 and through summer 38 to the brake valve driver 40 for applying a wheel braking force; and a negative feedback signal 33 into the gain circuit block 34 will produce a signal of a negative 1 $fps^2$ input to summer 30. Referring to FIG. 4, point A, at the initial application of the wheel braking force, the rate of aircraft deceleration is low; and for a wheel deceleration rate signal 22 which is less than the selected deceleration rate signal 19 by an amount $\Delta_2$, the output of the hysteresis circuit 15A will be negative. And, this negative signal will increase the wheel braking pressure, resulting in an increase in the rate of aircraft deceleration as shown by the positive slope of the line from point A to B. Referring to FIG. 3, as the wheel braking force is applied, the measured wheel deceleration rate signal in line 22 will increase, and this will reduce the amount of the positive error signal from summer 30 in line 31 to the saturated amplifier block 32. The wheel braking force will increase at a constant rate until the measured wheel deceleration rate signal in line 27 exceeds the selected rate of deceleration signal 20 by an amount $\Delta_1$, as indicated by point B in FIG. 4, or until the measured wheel deceleration rate equals or exceeds 11 $fps^2$. At which time, referring to FIG. 3, the output signal from summer 30 in line 31 becomes zero or negative, and this signal then through the saturated amplifier circuit in block 32 flips the circuit; and then produces a constant strength positive output signal 33. This positive signal 33 then causes a decrease in the wheel braking force and a corresponding reduction in the rate of airplane deceleration, as shown in FIG. 4 by the negative slope of the line from point B to C. Referring to FIG. 3, this positive output signal 33 fed back through block 34 produces a positive 1 $fps^2$ signal through line 35 to summer 30. In summer 28, the summation of selected deceleration rate signal 20 of 10 $fps^2$ and the measured wheel deceleration rate signal 27 of 11 $fps^2$ or more, will produce a negative error signal in line 29 to summer 30 of more than a minus 1 $fps^2$ which when summed with the positive 1 $fps^2$ signal from line 35 will produce a minus input signal 31 of 2 $fps^2$ to the saturated amplifier circuit 32. This will result in the amplifier circuit 32 continuing the output of a constant strength positive signal 33, to further decrease the wheel braking force. This will continue until the output of summer 30 into line 31 becomes positive again, or referring to FIG. 4, until the rate of airplane deceleration has decreased the specified amount of $\Delta_1 + \Delta_2$ or reached point C. The output from the hysteresis circuit 15A then becomes negative again and the rate of airplane deceleration then increases. This cyclic operation thus continues within the hysteresis circuit 15A in a counterclockwise direction around the loop. However, between the two limit values of $\Delta_1$ and $\Delta_2$, the sign of the output signal 33 depends on its previous state; i.e., if its output were negative, it will remain negative until the rate of wheel deceleration signal 22 exceeds the selected rate of deceleration signal 19 by the amount $\Delta_1$, at which time the signal 33 output will become positive; and if the output of the hysteresis cirucit 15A is positive, it will remain positive until the wheel deceleration rate is less than the selected rate by an amount $\Delta_2$, at which time it will then again become negative.

Figure 5:
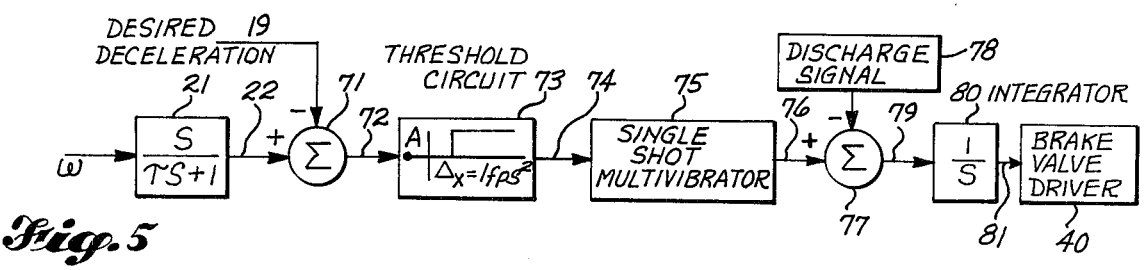
FIG. 5 is another embodiment of the Basic Deceleration Control Circuit shown in FIG. 3, wherein a threshold and single-shot multivibrator circuit is used instead of the hysteresis circuit.
Figure 5A:
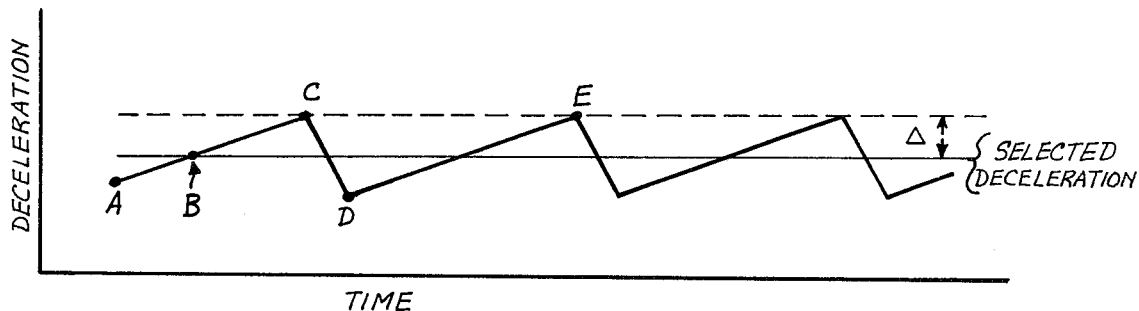
FIG. 5A shows a triangular wave form produced from a plot of the time history of the circuit in FIG. 5.

FIGS. 5 and 5A depict a second embodiment of the Basic Deceleration Control Circuit 15 which also uses a deceleration rate limit searching circuit system. The operation of this second embodiment system is similar to that of the Basic Deceleration Control Circuit 15, in that, in each of these systems each wheel is forced to a deceleration value slightly higher than the selected or airplane deceleration level, in order to obtain assurance that each wheel has sufficient torque to produce the selected deceleration rate. This second embodiment system utilizes a threshold and a single-shot multivibrator circuit instead of the hysteresis circuit 15A; and the signal inputs are again: the measured wheel rotational velocity signal $\omega_1$ which is put through a lagged differentiator block 21 to become a wheel deceleration rate signal 22, and the pilot selected deceleration rate signal on line 19. These two input signals 22 and 19, enter a summer 71, which could be equivalent to summer 28 in FIG. 3, wherein they are algebraically summed and their difference produces an error signal output in line 72 which enters the threshold circuit 73. When the measured wheel deceleration rate signal 22 is greater than the selected deceleration rate signal 19, a negative error signal is generated in line 72 to the threshold circuit 73. When this negative error signal 72 is of a zero or low amount, i.e., below a pre-set $\Delta$ amount shown in FIG. 5A, there will be no threshold circuit 73 output signal 74 of sufficient magnitude produced to trigger the single-shot multivibrator 75. The $\Delta$ amount, or tuning parameter of the threshold circuit 73, is approximately 10% of the selected deceleration rate or of some fixed constant amount e.g., 1 $fps^2$. However, when this negative error signal 72, exceeds the pre-set $\Delta$ amount, the threshold circuit 73 will produce a step-positive signal output put into line 74, which will enter the single-shot multivibrator 75. This step-positive input signal 74 will cause the single-shot multivibrator 75 to produce a single positive pulse of constant amplitude and of a fixed duration, which through line 76 will enter the summer 77. This positive signal 77 is summed with a negative discharge signal 78 of a constant level, and from summer 77 the output signal 79 enters the integrator 80. When the multivibrator 75 fires a single-pulse through summer 77 to the integrator 80, it will integrate the pulse and produce a constant rate signal change output 81 to the brake valve driver 40 which will result in a fixed, incremental decrease in the deceleration to a level below the threshold; and the sequence will then repeat.

In the second embodiment of the Basic Deceleration Control Circuit, the following description of operation of the circuit system shown in FIG. 5 will be more clearly understood when considered in combination with FIG. 5A. Beginning with the following assumptions: that the airplane is rolling unbraked down the runway at a constant speed; that the measured wheel deceleration rate signal on line 22 is zero; that the pilot selected deceleration rate signal on line 19 is 10 fps$^2$; then the output from summer 71 will be a negative value error signal equivalent to a minus 10 fps$^2$ into line 72 which enters the threshold circuit 73. The function of the threshold circuit 73 is depicted by an $x$, $y$, axis graph. Along the $x$-axis, represents a zero signal value, which in the circuit shown could be represented by a constant, low-level reference voltage; and to the left of the $y$-axis, represents the negative or minus sign of the signal. The negative value error signal 72, equivalent to a minus 10 fps$^2$, is shown on the threshold graph 73 as point A. Point A is shown on the left side of the $y$-axis and also directly along on the $x$-axis, for representing a constant low-level signal voltage equivalent to the minus signal value. Since the threshold circuit 73 produces a step-positive signal output 74, only when it receives a positive error signal input of a value greater than the pre-set $\Delta$ amount, the low constant voltage or zero value signal output from the threshold circuit 73 will not be enough to trigger the single-shot multivibrator 75 into producing a signal output. Therefore, this low constant voltage or zero signal output 74, will continue on through the single-shot multivibrator 75, and line 76, into summer 77, where it will be summed with a constant level negative discharge signal 78. Due to the greater value of the negative discharge signal from line 78, the output from summer 77 through line 79 to the integrator 80 will be of a negative value. This will cause the integrator 80 to integrate downward in a negative direction to produce a signal value becoming more negative, which will cause an increase in the braking pressure; and this is depicted in FIG. 5A by the positive slope of the line from point A to C. As the braking pressure is increased, the wheel deceleration rate is also increased along the line A–C. When the measured wheel deceleration rate signal 22 and the selected deceleration rate signal 19 coming into summer 71 are equal, the position is at the zero point or point B of the threshold circuit graph 73; and this position is depicted in FIG. 5A by the intersection of the positive slope line A–C with the solid horizontal line representing the selected deceleration rate signal 19 of 10 fps$^2$. As the measured wheel deceleration rate continues to increase along the line A–C, at some point indicated at C, it will reach the $\Delta$ amount of 1 fps$^2$ over the selected deceleration rate of 10 fps$^2$, or the measured wheel deceleration rate of 11 fps$^2$ which is represented by the upper dashed horizontal line. When this point is reached or exceeded, the threshold is crossed and the output of circuit 73 will switch from a low constant voltage or zero signal value to a high voltage signal value, and send out a step-positive signal 74 to the single-shot multivibrator 75. This will produce a constant duration pulse; e.g., of one-half of a second, with a constant amplitude positive signal of approximately one. During the duration of this pulse, there will be a positive signal output from the summer 77 which will cause the integrator 80 to integrate upward in a positive direction, and this will result in a decrease in braking pressure which as shown in FIG. 5A will correspond to the negative slope of the line from point C to D. As the braking pressure is decreased, the measured wheel deceleration rate will decrease along the line C–D until it goes below the selected deceleration rate, and the amount that it does go below will depend upon the amplitude of the pulse and the duration of the pulse or system gain; e.g., for a very long duration pulse or a higher amplitude pulse, more braking pressure will have to be taken off. The amplitude and width of the pulse are tuning parameters of the system for decreasing braking pressure along the negative slope line C–D. When the measured wheel deceleration rate has reached point D, the threshold circuit output signal 74 will again be at a low constant voltage or zero signal value, and the cycle will start over again.

Figure 6:
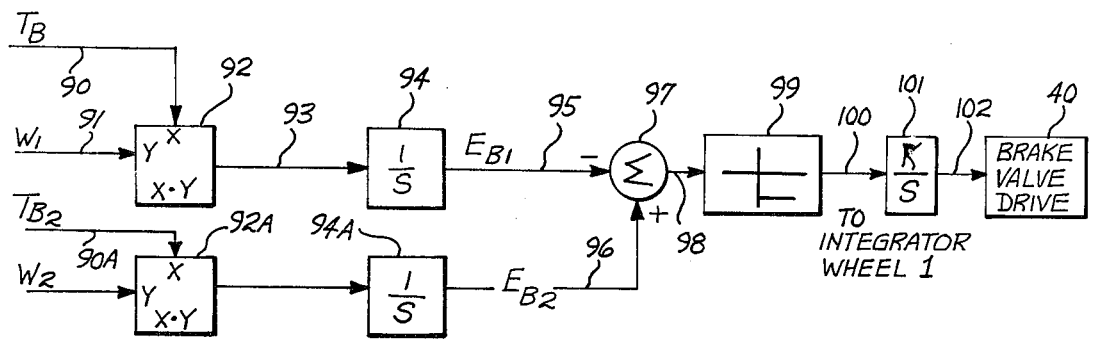
FIG. 6 shows in functional block diagram a Brake Energy Balance Control System.

FIG. 6 is a block diagram of a brake equalization or a brake energy balance control system, and the circuit depicted is for equalizing the braking energy between two wheels.

A brake energy balance control system is necessary to insure that all brakes are performing their assigned work load and to assure even wear of all the brakes, since an operation problem can result because a wheel can decelerate at the same rate that the airplane decelerates without any brake torque or braking pressure being applied. This problem manifests itself in that some of the brakes do all of the work in decelerating the airplane, which results in excessive wear and overheating of these brakes.

Brake energy balance control can be accomplished by either a passive method or an active method, as shown in FIG. 6, which essentially comprises a sub-control in which some function of brake energy is measured; and this measured brake energy is then compared to a reference signal for producing a control response action.

In controlling the deceleration of an airplane, the brake energy balance control system shown in FIG. 6 will function satisfactorily regardless of the method used for achieving the selected deceleration rate; such as thrust reversers, wing spoilers and flaps, or other means by which the selected deceleration rate can be accomplished without the use of brakes. Also, there is the possibility that the deceleration requirement may be met by braking only one wheel, or through wheels carrying unequal braking loads; and this could cause brake over-heating and excessive wear of the wheels carrying the braking load.

In FIG. 6, the measured rotational velocity of the wheel $\omega_1$ or wheelspeed signal 91 of the first wheel and its measured braking torque $T_{b1}$ signal 90 are inputs to a multiplier circuit 92. Wherein, the brake torque is mulitplied by the wheelspeed, and the product thereof is the rate at which the brake is doing work, or the rate at which the brake energy is being put into the wheel. This rate of brake energy signal 93 is sent to an integrator circuit 94, and the integral thereof is the brake energy $E_{b1}$; which is the input signal in line 95 to the summer 97. Also entering the summer 97 is similar brake energy signal $E_{b2}$ from the second wheel.

As an alternative, the first wheel brake energy signal $E_{b1}$ in line 95 could be compared in the summer 97 with an average brake energy input signal from all of the wheels.

The summer 97 output signal 98 will be the difference between the two input signals 95 and 96; and if the brake energy $E_{b2}$ from the second wheel is greater than the brake energy $E_{b1}$ from the first wheel, then from summer 97 the signal output 98 will be of a positive sign. This signal 98 will enter block 99 which depicts a standard $x$, $y$, coordinate graph: the $x$-axis is the input, with the right side of the $y$-axis being the positive input side; and the $y$-axis is the output, with the upper side of the $y$-axis being the positive output. For a positive signal input to block 99, which would be on the right side of the vertical $y$-axis, there will be a fixed amplitude or constant negative signal output, as indicated by the short horizontal line in the lower right quadrant off of the $y$-axis; and for a negative signal input, which would be on the left-side of the vertical $y$-axis, there will be a zero signal value output. With a negative signal of constant amplitude output from block 99 through line 100 to the integrator K/S in block 101 for the first wheel, the integrator signal output 102 to the brake valve driver 40 will cause the braking pressure to increase. And in a similar manner, when the brake energy of the first wheel is greater than the brake energy of the second wheel, there will be no signal output from the block 99 to the integrator 101, and hence no increase in brake pressure. A similar circuit, though, for the second wheel will cause its braking pressure to increase, thus equalizing brake energies.

An alternative to equalizing the brake energy as described in FIG. 6, would be to equalize the power or the rate at which energy is being put into the brake; and this can be done by eliminating the integrator circuit 94. So that instead of comparing, in summer 97, the brake energies from the two wheels or of one wheel and the average brake energy for the airplane, the rate of energy input to the brake would be compared.

Since the brake torque is difficult to measure, the brake pressure or the amount of current flow to the brake valve driver 40 could be used with sufficient accuracy to insure the proper operation of the system. Also, brake temperature could be used as an indication of brake energy.

The active methods of brake energy balance control comprises the use of a searching system, as shown in the hysteresis circuit 15A of FIG. 3, and the circuit shown in FIG. 5. In each of these systems the wheel is forced into a deceleration rate value slightly higher than the selected deceleration rate level; and in this way, assurance is obtained that each wheel has sufficient torque to produce the selected deceleration rate.

A passive method of brake energy balance control involves producing approximately the same torque in all of the brakes, and this can be done by supplying the same pressure to all of the brakes through the use of a common valve for all brakes, or through the use of a common control circuit for all of the wheels including, as shown in FIG. 3, the Large Deviation Control Circuit 16, on an individual wheel basis. Thereby, forcing the low pressure level wheels toward a higher pressure.

What is claimed is:

1. In a limited-slip brake control system for wheels of an aircraft having wheel braking means, said system comprising: means for providing a signal representative of the rotational speed of a wheel; means for receiving said wheelspeed signal and differentiating it to produce a signal representative of the rate of rotational deceleration of the wheel; means for summing the wheel deceleration signal output from a plurality of wheels of vehicle; means for averaging the summed wheel deceleration signals by dividing the summed signals by the number of wheels summed and producing an average wheel deceleration signal; means for providing a reference signal representative of a selected rate of deceleration; means for comparing said wheel deceleration signal to said reference signal and producing a first error signal; a hysteresis circuit for receiving said first error signal and producing a constant level positive or negative signal depending upon the sign of said first error signal; and means for integrating said hysteresis circuit output signal and producing a wheel braking force control signal.

2. In a limited-slip brake control system for wheels of an aircraft having wheel braking means, said system comprising: means for providing a signal representative of the rotational speed of a wheel; means for receiving said wheelspeed signal and differentiating it to produce a signal representative of the rate of rotational deceleration of the wheel; summing means for combining the wheel deceleration signal output from a plurality of wheels of the aircraft, averaging means for dividing the summed wheel deceleration signals by the number of wheels summed and producing an average wheel deceleration rate signal; means for providing a reference signal representative of a selected rate of deceleration; means for comparing said wheel deceleration signal to said reference signal and producing a first error signal; a hysteresis circuit for receiving said first error signal and producing a constant level positive or negative signal depending upon the sign of said first error signal; and means for integrating said hysteresis circuit output signal and producing a wheel braking force control signal.

3. In a limited-slip brake control system for wheels of an aircraft having wheel braking means, the combination of: selector means for producing a signal representative of a predetermined rate of wheel deceleration; differentiator means for producing a wheel deceleration signal from a signal proportional to the rotational velocity of the wheel; a basic deceleration control circuit coupled to the outputs from said differentiator means and said selector means, for producing a basic brake control signal to maintain the wheel deceleration rate at the level provided by said selector means; a large deviation control circuit coupled to said differentiator means and to said selector means, for providing an exponentially increasing output signal causing a rapid decrease in the wheel braking effort when activated by a predetermined increase in the wheel deceleration signal over that of the selected deceleration signal, and for providing an exponentially decreasing output signal to gradually return control of the wheel braking effort to said basic deceleration control circuit; summing means for combining the output signals from said basic deceleration control circuit and said large deviation control circuit, and producing a system output signal; and brake control valve means for converting said system output signal into a corresponding wheel braking effort.

4. The brake control system as set forth in claim 3, wherein said basic deceleration control circuit comprises: comparator means for providing a signal proportional to the difference between said predetermined deceleration signal from said selector means and said wheel deceleration signal from said differentiator means; threshold circuit means coupled to the output from said comparator means for producing a trigger signal when said comparator means output signal exceeds a predetermined level; single-shot multivibrator means coupled to the output from said threshold circuit means for producing a constant amplitude, constant duration pulse; and integrator means coupled to the output from said single-shot multivibrator means for producing a rapid decrease in braking effort for the duration of said pulse from said single-shot multivibrator means and for producing a gradual increase in braking effort in the absence of said pulse from said single-shot multivibrator means.

5. The brake control system as set forth in claim 3, further including: a selector deceleration control circuit interposed between said basic deceleration control circuit and said large deviation control circuit for automatically adjusting the signal strength of the reference signal downwards when the runway surface conditions will not permit the airplane to achieve the selected deceleration rate without tire skid.

6. The brake control system as set forth in claim 5, wherein said selector deceleration control circuit comprises: amplifier means for providing a step-signal output when said large deviation control circuit is activated; time constant means coupled to the output from said amplifier means for providing an exponentially increasing and decreasing signal; and summer means for coupling said time constant signal to said selector switch signal resulting initially in a substantial decrease in the strength of the reference signal reaching said summer when said large deviation control is deactivated.

7. In a limited-slip brake control system for wheels of an aircraft having wheel braking means, the combination of: first means for producing a wheel deceleration signal from a signal proportional to the rotational velocity of the wheel; second means for producing a reference signal representative of a predetermined rate of wheel deceleration; a basic deceleration control circuit coupled to the signal outputs from said first and second means for producing a basic wheel braking control signal to maintain the wheel deceleration rate at the level of said reference signal; a large deviation control circuit coupled to the signal outputs from said first and second means for providing a corrective backup control action to quickly reduce wheel braking effort when activated by the wheel suddenly being forced into a skid condition; summing means coupled to the signal outputs from said basic deceleration control circuit and said large deviation control circuit for combining their signal outputs and producing a system output signal that controls the wheel braking effort; said large deviation control circuit being activated by the wheel deceleration signal of said first means exceeding the selected deceleration reference signal of said second means by a predetermined step-increase amount, such as a wheel being suddenly forced into a skid condition, thereby producing an exponentially increasing signal output to said summing means for causing a rapid decrease in the wheel braking effort; and said large deviation control circuit being deactivated by the wheel deceleration signal output of said first means decreasing below said predetermined step-increase of the selected deceleration reference signal of said second means, thereby producing an exponentially decreasing signal output to said summing means for gradually returning control of the wheel braking effort to said basic deceleration control circuit.

8. The brake control system as set forth in claim 7, wherein said deceleration control means comprises: comparator means for providing a signal proportional to the difference between said predetermined deceleration signal from said selector means and said wheel deceleration signal from said differentiator means; threshold circuit means coupled to the output from said comparator means for producing a trigger signal when said comparator means output signal exceeds a predetermined level; single-shot multivibrator means coupled to the output from said threshold circuit means for producing a constant amplitude, constant duration pulse; and integrator means coupled to the output from single-shot multivibrator means for producing a rapid decrease in braking effort for the duration of said pulse from said single-shot multivibrator means and for producing a gradual increase in braking effort in the absence of said pulse from said single-shot multivibrator means.

9. The brake control system as set forth in claim 7, further including: a selector deceleration control circuit interposed between said basic deceleration control circuit and said large deviation control circuit for automatically adjusting the signal strength of the reference signal downwards when the runway surface conditions will not permit the airplane to achieve the selected deceleration rate without tire skid.

10. The brake control system as set forth in claim 9, wherein said selector deceleration control circuit comprises: amplifier means for providing a step-signal output when said large deviation control circuit is activated; time constant means coupled to the output from said amplifier means for providing an exponentially increasing and decreasing signal; and summer means for coupling said time constant output signal to said selector switch signal resulting initially in a substantial decrease in the strength of the reference signal reaching said summer when said large deviation control is deactivated.

11. In a limited-slip brake control system for wheels of an aircraft having wheel braking means, the combination of: means for providing a signal representative of the rotational speed of a wheel; differentiating means for receiving said wheelspeed signal and differentiating it to produce a signal representative of the rate of rotational deceleration of the wheel; selector means for providing a reference signal representative of a predetermined rate of deceleration; a basic deceleration control circuit coupled to the signal outputs from said differentiating means and said selector means for producing a basic wheel braking force control signal to maintain the wheel deceleration rate at the level of said reference signal; said basic deceleration control circuit comprising: summing means for combining the wheel deceleration signal output from a plurality of wheels of the vehicle, averaging means for producing an average wheel deceleration signal from the summed wheel deceleration signals, means for comparing said average wheel deceleration signal to said reference signal and producing a first error signal, a hysteresis circuit for receiving said first error signal and producing a constant level positive or negative signal depending upon the sign of said first error signal, and means for integrating said hysteresis circuit output signal and producing said basic wheel braking force control signal; a large deviation control circuit coupled to the signal outputs from said differentiating means and said selector means for providing a corrective backup control action to quickly reduce wheel braking effort when activated by the wheel suddenly being forced into a skid condition; summing means coupled to the signal outputs from said basic deceleration control circuit and said large deviation control circuit for combining their signal outputs and producing a system output signal that controls the wheel braking effort; said large deviation control circuit being activated by the wheel deceleration signal of said differentiating means exceeding the selected deceleration reference signal of said selector means by a predetermined step-increase amount, such as a wheel being suddenly forced into a skid condition, thereby producing an exponentially increasing signal output to said summing means for causing a rapid decrease in the wheel braking effort; and said large deviation control circuit being deactivated by the wheel deceleration signal output of said differentiating means decreasing below said predetermined step-increase of the selected deceleration reference signal of said selector means, thereby producing an exponentially decreasing signal output to said summing means for gradually returning control of the wheel braking effort to said basic deceleration control circuit.

12. The brake control system as set forth in claim 11, further including: a selector deceleration control circuit interposed between said basic deceleration control circuit and said large deviation control circuit for automatically adjusting the signal strength of the reference signal downwards when the runway surface conditions will not permit the airplane to achieve the selected deceleration rate without tire skid.

13. The brake control system as set forth in claim 12, wherein said selector deceleration control circuit comprises: amplifier means for providing a step-signal output when said large deviation control circuit is activated; time constant means coupled to the output from said amplifier means for providing an exponentially increasing and decreasing signal; and summer means for coupling said time constant output signal to said selector switch signal resulting initially in a substantial decrease in the strength of the reference signal reaching said summer when said large deviation control is deactivated.

14. In a limited-slip brake control system for a multi-wheeled landing gear of an aircraft having wheel braking means, said system comprising: means for providing first and second wheelspeed signals representative of the rotational velocities of a first and a second wheel; means for receiving said first and second wheelspeed signals and differentiating them to produce respectively first and second wheel deceleration signals representative of the rate of rotational deceleration of each of said wheels; means for summing said first and second wheel deceleration signals; means for producing an average wheel deceleration signal from said summed wheel deceleration signals; means for providing a reference signal representative of a selected rate of deceleration; means for comparing said reference signal to said wheel deceleration signal and producing a wheel deceleration error signal; a hysteresis circuit for receiving said wheel deceleration error signal and producing either a constant level positive signal or a constant level negative signal depending upon the sign of sign of said wheel deceleration error signal; means for integrating said hysteresis circuit output signal and producing a system deceleration control signal; a brake energy balance system for modulating said system deceleration control signal to equalize the braking work load between said first and second wheels, said system comprising: means for producing a first and a second brake torque signal representative of the braking work load applied respectively by said first and second wheels a first multiplier circuit means coupled to receive said first wheelspeed signal and said first brake torque signal, and producing a first brake energy signal; a second multiplier circuit means coupled to receive said second wheelspeed signal and said second brake torque signal, and producing a second brake energy signal; a first integrator circuit means coupled to receive said first brake energy signal and producing a first brake energy integral signal; a second integrator circuit means coupled to receive said second brake energy signal and producing a second brake energy integral signal; summer coupled to receive said first and second brake energy integral signals, and producing a brake energy error signal representing the difference between the said received signals; in said summer if the brake energy of the first wheel is greater than that of the second wheel, then the sign of the brake energy error signal will be negative, if the brake energy of the second wheel is greater than the brake energy of the first wheel, then the brake energy error signal will be of a positive sign; saturated amplifier means coupled to the signal output from said summer for producing either a step output signal of a fixed amplitude and negative value for a positive sign brake energy error signal input, or a step output signal of a fixed amplitude and negative value for a negative sign brake energy error signal input; integrator means coupled to the signal output from said circuit means for producing a brake energy control signal to modulate said system deceleration control signal to said first wheel braking means, such that when the brake energy of said first wheel braking means is greater than the brake energy of the second wheel, there will be no signal output from block to integrator and therefore no system deceleration control signal change to said first wheel braking means, and when the brake energy of said first wheel braking means is less than the brake energy of the second wheel, there will be a step output signal of a fixed amplitude negative value from block to integrator and hence an increase in the system deceleration control signal to said first wheel braking means for increasing the brake pressure.

15. In a limited-slip brake control system for a multi-wheeled landing gear of an aircraft having wheel braking means, said system comprising: means for providing first and second wheelspeed signals representative of the rotational velocities of a first and a second wheel; differentiator means for producing respectively first and second wheel deceleration signals representative of the rate of rotational deceleration of each of said wheels; selector means for providing a reference signal representative of a predetermined rate of wheel deceleration; a basic deceleration control circuit coupled to the outputs from said differentiator means and said selector means, for producing a basic brake control signal to maintain the wheel deceleration rate at the level provided by said selector means; a large deviation control circuit coupled to said differentiator means and to said selector means, for providing an exponentially increasing output signal causing a rapid decrease in the wheel braking effort when activated by a predetermined increase in the wheel deceleration signal over that of the selected deceleration signal, and for providing an exponentially decreasing output signal to gradually return control of the wheel braking effort to said basic deceleration control circuit; summing means for combining the output signals from said basic deceleration control circuit, and producing a system output signal; and a brake energy balance system for modulating said system deceleration control signal between said first and second wheels to equalize the braking work load.

16. The brake control system as set forth in claim 15, wherein said basic deceleration control circuit comprises: comparator means for providing a signal proportional to the difference between said predetermined deceleration signal from said selector means and said wheel deceleration signal from said differentiator means; threshold circuit means coupled to the output from said comparator means for producing a trigger signal when said comparator means output signal exceeds a predetermined level; single-shot multivibrator means coupled to the output from said threshold circuit means for producing a constant amplitude, constant duration pulse; and integrator means coupled to the output from said single-shot multivibrator means for producing a rapid decrease in braking effort for the duration of said pulse from said single-shot multivibrator means and for producing a gradual increase in braking effort in the absence of said pulse from said single-shot multivibrator means.

17. The brake control system as set forth in claim 16, further including: a selector deceleration control circuit interposed between said basic deceleration control circuit and said large deviation control circuit for automatically adjusting the representative rate of rotational deceleration of the reference signal downwards when the runway surface conditions will not permit the airplane to achieve the selected deceleration rate without tire skid.

18. The brake control system as set forth in claim 17, wherein said selector deceleration control circuit comprises: amplifier means for providing a step-signal output when said large deviation control circuit is activated; time constant means coupled to the output from said amplifier means for providing an exponentially increasing and decreasing signal; and summer means for coupling said time constant output signal to said selector switch signal resulting initially in a substantial decrease in the strength of the reference signal reaching said summer when said large deviation control is deactivated.

19. In a limited-slip brake control system for a multi-wheeled landing gear of an aircraft having wheel braking means, said system comprising: differentiator means for producing first and second wheel deceleration signals from first and second wheelspeed signals proportional to the rotational velocities of each wheel; selector means for producing a reference signal representative of a pedetermined rate of wheel deceleration; a basic deceleration control circuit coupled to the signal outputs from said differentiator means and said selector means for producing a basic wheel braking control signal to maintain the rate of wheel deceleration at the level of said reference signal; a large deviation control circuit coupled to the signal outputs from said differentiator means and said selector means for providing a corrective backup control action to quickly reduce wheel braking effort when activated by a wheel suddenly entering a skid condition; summing means coupled to the signal outputs from said basic deceleration control circuit and said large deviation control circuit for combining their signal outputs and producing a system output signal to control the wheel braking effort; said large deviation control circuit being activated by a wheel deceleration signal exceeding the selected deceleration reference signal by a predetermined step-increase amount, and producing an exponentially increasing signal output to said summing means for causing a rapid decrease in the wheel braking effort; said large deviation control circuit being deactivated by a wheel deceleration signal decreasing below said predetermined step-increase of the selected reference signal, thereby producing an exponentially decreasing signal output to said summing means for gradually returning control of the wheel braking effort to said basic deceleration control circuit; a brake energy balance system for modulating said system deceleration control signal between said first and second wheels to equalize the braking work load; said brake energy balance system comprising: means for producing first and second brake torque signals representative of the braking work load applied respectively by said first and second wheels; a first multiplier circuit means coupled to receive said first wheelspeed signal and said first brake torque signal, and producing a first brake energy signal; a second multiplier circuit means coupled to receive said second wheelspeed signal and said second brake torque signal, and producing a second brake energy signal; a first integrator circuit means coupled to receive said first brake energy signal and producing a first brake energy integral signal; a second integrator circuit means coupled to receive said second brake energy signal and producing a second brake energy integral signal; summer coupled to receive said first and second brake energy integral signals, and producing a brake energy error signal representing the difference between the said received signals; saturated amplifier means coupled to the signal output from said summer for producing a step output signal; integrator means coupled to receive said step output signal from said saturated amplifier means for producing a brake energy control signal to modulate said system deceleration control signal for equalizing the braking work load between said first and second wheels.

20. The brake control system as set forth in claim 19, wherein said basic deceleration control circuit comprises: comparator means for providing a signal proportional to the difference between said predetermined deceleration signal from said selector means and said wheel deceleration signal from said differentiator means; threshold circuit means coupled to the output from said comparator means for producing a trigger signal when said comparator means output signal exceeds a predetermined level; single-shot multivibrator means coupled to the output from said threshold circuit means for producing a constant amplitude, constant duration pulse; and integrator means coupled to the output from said single-shot multivibrator means for producing a rapid decrease in braking effort for the duration of said pulse from said single-shot multivibrator means and for producing a gradual increase in braking effort in the absence of said pulse from said single-shot multivibrator means.

21. The brake control system as set forth in claim 19, further including: a selector deceleration control circuit interposed between said basic deceleration control circuit and said large deviation control circuit for automatically adjusting the representative rate of rotational deceleration of the reference signal downwards when the runway surface conditions will not permit the airplane to achieve the selected deceleration rate without tire skid.

22. The brake control system as set forth in claim 21, wherein said selector deceleration control circuit comprises: amplifier means for providing a step-signal output when said large deviation control circuit is activated; time constant means coupled to the output from said amplifier means for providing an exponentially increasing and decreasing signal; and summer means for coupling said time constant output signal to said selector switch signal resulting initially in a substantial decrease in the strength of the reference signal reaching said summer when said large deviation control is deactivated.

23. In a limited-slip brake control system for a multi-wheeled landing gear of an aircraft having wheel braking means, said system comprising: means for providing first and second wheelspeed signals representative of the rotational velocities of a first and a second wheel; differentiator means for producing respectively first and second wheel deceleration signals representative of the rate of rotational deceleration of each of said wheels; selector means for providing a reference signal representative of a predetermined rate of wheel deceleration; a basic deceleration control circuit coupled to the signal outputs from said differentiator means and said selector means, for producing a basic wheel braking control signal to maintain the wheel deceleration rate at the level of said reference signal; said basic deceleration control circuit comprising: summing means for combining said first and second wheel deceleration signals; averaging means for producing an average wheel deceleration signal from said summed wheel deceleration signals; means for comparing said average wheel deceleration signal to said reference signal and producing a wheel deceleration error signal; a hysteresis circuit for receiving said wheel deceleration error signal and producing a constant level positive or negative signal depending upon the sign of said wheel deceleration error signal; means for integrating said hysteresis circuit output signal and producing said basic wheel braking control signal; a large deviation control circuit coupled to the signal outputs from said differentiator means and said selector means for providing a corrective backup control action to quickly reduce wheel braking effort when activated by a wheel suddenly entering a skid condition; summing means coupled to the signal outputs from said basic deceleration control circuit and said large deviation control circuit for combining their signal outputs and producing a system output signal to control the wheel braking effort; said large deviation control circuit being activated by a wheel deceleration signal exceeding the selected deceleration reference signal by a predetermined step-increase amount, and producing an exponentially increasing signal output to said summing means for causing a rapid decrease in the wheel braking effort; said large deviation control circuit being deactivated by a wheel deceleration signal decreasing below said predetermined step-increase of the selected reference signal, thereby producing an exponentially decreasing signal output to said summing means for gradually returning control of the wheel braking effort to said basic deceleration control circuit; a brake energy balance system for modulating said system deceleration control signal between said first and second wheels to equalize the braking work load; said brake energy balance system comprising: means for producing a first and a second brake torque signal representative of the braking work load applied respectively by said first and second wheels; a first multiplier circuit means coupled to receive said first wheelspeed signal and said first brake torque signal, and producing a first brake energy signal; a second multiplier circuit means coupled to receive said second wheelspeed signal and said second brake torque signal, and producing a second brake energy signal; a first integrator circuit means coupled to receive said first brake energy signal and producing a first brake energy integral signal; a second integrator circuit means coupled to receive said second brake energy signal and producing a second brake energy integral signal; summer coupled to receive said first and second brake energy integral signals, and producing a brake energy error signal representing the difference between the said received signals; saturated amplifier means coupled to the signal output from said summer for producing a step output signal; integrator means coupled to receive said step output signal from said saturated amplifier means for producing a brake energy control signal to modulate said system deceleration control signal for equalizing the braking work load between said first and said second wheels.

24. The brake control system as set forth in claim 23, further including: a selector deceleration control circuit interposed between said basic deceleration control circuit and said large deviation control circuit for automatically adjusting the representative rate of rotational deceleration of the reference signal downwards when the runway surface conditions will not permit the airplane to achieve the selected deceleration rate without tire skid.

25. The brake control system as set forth in claim 24, wherein said selector deceleration control circuit comprises: amplifier means for providing a step-signal output when said large deviation control circuit is activated; time constant means coupled to the output from said amplifier means for providing an exponentially increasing and decreasing signal; and summer means for coupling said time constant output signal to said selector switch signal resulting initially in a substantial decrease in the strength of the reference signal reaching said summer when said large deviation control is deactivated.

26. A brake energy balance system for a multi-wheeled aircraft, comprising: means for measuring the rotational velocities of first and second wheels, and producing first and second wheelspeed signals; means for measuring the braking torques of said first and said second wheels, and producing first and second brake torque signals; a first multiplier circuit means coupled to receive said first wheelspeed signal and said first brake torque signal, and multiplying said first wheelspeed signal by said first brake torque signal, and producing the product thereof as a first brake energy signal; a second multiplier circuit means coupled to receive said second wheelspeed signal and said second brake torque signal, and multiplying said second wheelspeed signal by said second brake torque signal, and producing the product thereof as a second brake energy signal; a first integrator circuit means coupled to receive said first brake energy signal and integrating said first brake energy signal to produce a first brake energy integral signal; a second integrator circuit means coupled to receive said second brake energy signal and integrating said second brake energy signal to produce a second brake energy integral signal; summer coupled to receive said first and second brake energy integral signals, and produce an output signal representing the difference between the said received signals, such that if the brake energy of the first wheel is greater than that of the second wheel, then the sign of the signal output will be negative and if the brake energy of the second wheel is greater than the brake energy from the first wheel, then the signal output will be of a positive sign; circuit means coupled to the signal output from said summer and producing a step output signal of fixed amplitude negative value for a positive sign signal input, or producing a step output signal of a fixed amplitude negative value for a negative sign signal input; integrator means coupled to the signal output from said circuit means for producing a wheel braking force control signal to said first wheel, such that when the brake energy of the first wheel is greater than the brake energy of the second wheel, there will be no signal output from said circuit means to said integrator means and hence no increase in the brake pressure to the first wheel, and when the brake energy of the first wheel is less than the brake energy of the second wheel, there will be a step output signal of a fixed amplitude negative value from said circuit means to said integrator means and hence an increase in the brake pressure to the first wheel.

27. A method for limiting the application of braking torque to wheels of an airplane having wheel braking means, such that the tire to runway frictional forces remain within the non-slip portion of the characteristic Mu/slip curve, comprising the steps of: generating a wheel deceleration signal representative of the rate of deceleration of the wheels of the airplane, from a signal proportional to the rotational velocity of the wheel; selecting a reference signal representative of a predetermined rate of airplane deceleration for maintaining the ground frictional force of tires on the non-slip side of the characteristic Mu/slip curve; producing a first brake control signal for maintaining the rate of airplane deceleration at the selected level, from a comparison of said reference signal with said differentiated signal within a basic deceleration control circuit; generating a second brake control signal to quickly reduce wheel braking effort when a large deviation control circuit is activated by a predetermined increase in the wheel deceleration signal over that of the selected reference signal such as by the wheel suddenly being forced into a skid condition; summing said first and second brake control signals, and producing a system output signal for controlling the wheel braking effort; said generated second brake control signal being of an exponentially increasing signal output for causing a rapid decrease in the wheel braking effort when said wheel deceleration signal exceeds the selected deceleration reference signal by a predetermined step-increase amount; and said second brake control signal being of an exponentially decreasing signal output for causing a gradual control of the wheel braking effort to the basic deceleration control circuit when said wheel deceleration signal decreases below said predetermined step-increase of the selected deceleration reference signal.

28. A percent-slip brake control system for limiting the application of braking torque to wheels of a vehicle having wheel braking means, such that the tire frictional force remains within the non-slip portion of the characteristic Mu/slip curve, said system comprising: means for providing a signal representative of the rotational speed of a first wheel in engagement with a roadway surface; means for receiving said first wheelspeed signal and differentiating it to produce a signal representative of the rate of rotational deceleration of said first wheel; means for summing the wheel deceleration signal output from a plurality of wheels of the vehicle; means for averaging the summed wheel deceleration signals by dividing the summed signals by the number of wheels summed and producing an average wheel deceleration signal; means for providing a reference signal representative of a predetermined percent-slip range within which the wheel is to operate in order that an adequate margin of tire frictional force remains for directional steering control; means for comparing said first wheel deceleration signal to said reference signal and producing an error signal; a hysteresis circuit for receiving said error signal and producing a constant level positive or negative signal depending upon the sign of said error signal; and means for integrating said hysteresis circuit output signal and producing a braking torque control signal to said first wheel of the vehicle.

29. A percent-slip brake control system for limiting the application of braking torque to wheels of a vehicle having wheel braking means, such that the tire frictional force remains within the non-slip portion of the characteristic Mu/slip curve, said system comprising: means for providing a signal representative of the rotational speed of a first wheel engaged with the surface of the ground; means for receiving said first wheelspeed signal and differentiating it to produce a signal representative of the rate of rotational deceleration of said first wheel; summing means for combining the wheel deceleration signal output from a plurality of wheels of the vehicle; averaging means for dividing the summed wheel deceleration signals by the number of wheels summed and producing an average wheel deceleration rate signal; means for providing a reference deceleration signal representative of a predetermined percent-slip range within which the first wheel is to operate in order that an adequate margin of tire frictional force remains for directional steering control; means for comparing said reference deceleration signal to said wheel deceleration signal and producing an error signal; a hysteresis circuit for receiving said error signal and producing a constant level positive or negative signal depending upon the sign of said first error signal; and means for integrating said hysteresis circuit output signal and producing a braking torque control signal to said first wheel of the vehicle.

30. A percent-slip brake control system for maintaining the tire frictional force of wheels of a vehicle within the non-slip portion of the characteristic Mu/slip curve, the combination of: selector means for producing a reference signal representative of a predetermined percent-slip range within which tires are to operate according to prevailing roadway surface conditions; differentiator means for producing a wheel deceleration signal from a signal proportional to the rotational velocity of a wheel; a basic deceleration control circuit coupled to a outputs from said differentiator means and said selector means, for producing a basic brake torque control signal to maintain the wheel deceleration rate at the level provided by said selector means; a large deviation control circuit coupled to said differentiator means and to said selector means, for providing an exponentially increasing output signal causing a rapid decrease in the wheel braking effort when activated by a predetermined increase in the wheel deceleration signal over that of the selected reference signal, such as when the tires enter a skid condition, and for providing an exponentially decreasing output signal to gradually return control of the wheel braking effort to said basic deceleration control circuit; summing means for combining the output signals from said basic deceleration control circuit and said large deviation control circuit, and producing a system output signal; and brake control valve means for converting said system output signal into a corresponding wheel braking effort at a level consistant with the surface conditions of the roadway.

31. The percent-slip brake control system as set forth in claim 30, wherein said basic deceleration control circuit comprises: comparator means for providing a signal proportional to the difference between said reference signal from said selector means and said wheel deceleration signal from said differentiator means; threshold circuit means coupled to the output from said comparator means for producing a trigger signal when said comparator means output signal exceeds a predetermined level; single-shot multivibrator means coupled to the output from said threshold circuit means for producing a constant amplitude, constant duration pulse; and integrator means coupled to the output from said single-shot multivibrator means for producing a rapid decrease in wheel braking effort for the duration of said pulse from said single-shot multivibrator means and for producing a gradual increase in wheel braking effort in the absence of said pulse from said single-shot multivibrator means.

32. The percent-slip brake control system as set forth in claim 30, further including: a selector control circuit interposed between said basic deceleration control circuit and said large deviation control circuit for automatically adjusting the signal strength of the reference signal downwards when the roadway surface conditions will not permit the tires to achieve the selected percent-slip range within which they are to operate.

33. The percent-slip brake control system as set forth in claim 32, wherein said selector control circuit comprises: amplifier means for providing a step-signal output when said large deviation control circuit is activated; time constant means coupled to the output from said amplifier means for providing an exponentially increasing and decreasing signal; and summer means for coupling said time constant output signal to said selector switch signal resulting initially in a substantial decrease in the strength of the reference signal reaching said summer when said large deviation control is deactivated.

34. A percent-slip brake control system for limiting the application of braking torque to wheels of a vehicle having wheel braking means, such that the tire frictional force remains within the non-slip portion of the characteristic Mu/slip curve, said system comprising: first means for producing a wheel deceleration signal from a signal proportional to the rotational velocity of a wheel; second means for providing a deceleration reference signal representative of a predetermined percent-slip range within which the wheel is to operate in order that adequate directional steering control is achieved; a basic deceleration control circuit coupled to the signal outputs from said first and second means for producing a basic wheel braking control signal to maintain the wheel deceleration rate at the level of said reference signal; a large deviation control circuit coupled to the signal outputs from said first and second means for providing a corrective backup control action to quickly reduce wheel braking effort when activated by the wheel suddenly being forced into a skid condition; summing means coupled to the signal outputs from said basic deceleration control circuit and said large deviation control circuit for combining their signal outputs and producing a system output signal that controls the wheel braking effort; said large deviation control circuit being activated by the wheel deceleration signal of said first means exceeding the selected deceleration reference signal of said second means by a predetermined step-increase amount, such as a wheel being suddenly forced into a skid condition, thereby producing an exponentially increasing signal output to said summing means for causing a rapid decrease in the wheel braking effort; and said large deviation control circuit being deactivated by the wheel deceleration signal output of said first means decreasing below said predetermined step-increase of the selected deceleration reference signal of said second means, thereby producing an exponentially decreasing signal output of said summing means for gradually returning control of the wheel braking effort to said basic deceleration control circuit.

35. The brake control system as set forth in claim 34, wherein said deceleration control means comprises: comparator means for providing a signal proportional to the difference between said predetermined deceleration signal from said selector means and said wheel deceleration signal from said differentiator means; threshold circuit means coupled to the output from said comparator means for producing a trigger signal when said comparator means output signal exceeds a predetermined level; single-shot multivibrator means coupled to the output from said threshold circuit means for producing a constant amplitude, constant duration pulse; and integrator means coupled to the output from said single-shot multivibrator means for producing a rapid decrease in braking effort for the duration of said pulse from said single-shot multivibrator means and for producing a gradual increase in braking effort in the absence of said pulse from said single-shot multivibrator means.

36. The brake control system as set forth in claim 34, further including: a selector deceleration control circuit interposed between said basic deceleration control circuit and said large deviation control circuit for automatically adjusting the representative rate of rotational deceleration of the reference signal downwards when the road surface conditions will not permit the vehicle to achieve the selected deceleration rate without tire skid.

37. The brake control system as set forth in claim 36, wherein said selector deceleration control circuit comprises: amplifier means for providing a step-signal output when said large deviation control circuit is activated; time constant means coupled to the output from said amplifier means for providing an exponentially increasing and decreasing signal; and summer means for coupling said time constant output signal to said selector switch signal resulting initially in a substantial decrease in the strength of the reference signal reaching said summer when said large deviation control is deactivated.

38. In a limited-slip brake control system for wheels of a vehicle having wheel braking means, the combination of: means for providing a signal representative of the rotational speed of a wheel; differentiating means for receiving said wheelspeed signal and differentiating it to produce a signal representative of the rate of rotational deceleration of the wheel; selector means for providing a reference signal representative of a predetermined rate of deceleration; a basic deceleration control circuit coupled to the signal outputs from said differentiating means and said selector means for producing a basic wheel braking force control signal to maintain the wheel deceleration rate at the level of said reference signal; said basic deceleration control circuit comprising: summing means for combining the wheel deceleration signal output from a plurality of wheels of the vehicle, averaging means for producing an average wheel deceleration signal from the summed wheel deceleration signals, means for comparing said average wheel deceleration signal to said reference signal and producing a first error signal, a hysteresis circuit for receiving said first error signal and producing a constant level positive or negative signal depending upon the sign of said first error signal, and means for integrating said hysteresis circuit output signal and producing said basic wheel braking force control signal; a large deviation control circuit coupled to the signal outputs from said differentiating means and said selector for providing a corrective backup control action to quickly reduce wheel braking effort when activated by the wheel suddenly being forced into a skid condition; summing means coupled to the signal outputs from said basic deceleration control circuit and said large deviation control circuit for combining their signal outputs and producing a system output signal that controls the wheel braking effort; said large deviation control circuit being activated by the wheel deceleration signal of said differentiating means exceeding the selected deceleration reference signal of said selector means by a predetermined step-increase amount, such as a wheel being suddenly forced into a skid condition, thereby producing an exponentially increasing signal output to said summing means for causing a rapid decrease in the wheel braking effort; and said large deviation control circuit being deactivated by the wheel deceleration signal output of said differentiating means decreasing below said predetermined step-increase of the selected deceleration reference signal of said selector means, thereby producing an exponentially decreasing signal output to said summing means for gradually returning control of the wheel braking effort to said basic deceleration control circuit.

39. The brake control system as set forth in claim 38, further including: a selector deceleration control circuit interposed between said basic deceleration control circuit and said large deviation control circuit for automatically adjusting the representative rate of rotational deceleration of the reference signal downwards when the road surface conditions will not permit the vehicle to achieve the selected deceleration rate without tire skid.

40. The brake control system as set forth in claim 39, wherein said selector deceleration control circuit comprises: amplifier means for providing a step-signal output when said large deviation control circuit is activated; time constant means coupled to the output from said amplifier means for providing an exponentially increasing and decreasing signal; and summer means for coupling said time constant output signal to said selector switch signal resulting initially in a substantial decrease in the strength of the reference signal reaching said summer when said large deviation control is deactivated.

41. In a limited-slip brake control system for a multi-wheeled vehicle having wheel braking means, said system conprising: means for providing first and second wheelspeed signals representative of the rotational velocities of a first and a second wheel; means for receiving said first and second wheelspeed signals and differentiating them to produce respectively, first and second wheel deceleration signals representative of the rate of rotational deceleration of each of said wheels; means for summing said first and second wheel deceleration signals; means for producing an average wheel deceleration signal from said summed wheel deceleration signals; means for providing a reference signal representative of a selected rate of deceleration; means for comparing said reference signal to said wheel deceleration signal and producing a wheel deceleration error signal; a hysteresis circuit for receiving said wheel deceleration error signal and producing either a constant level positive signal or a constant level negative signal depending upon the sign of sign of said wheel deceleration error signal; means for integrating said hysteresis circuit output signal and producing a system deceleration control signal; a brake energy balance system for modulating said system deceleration control signal to equalize the braking work load between said first and second wheels, said system comprising: means for producing a first and a second brake torque signal representative of the braking work load applied respectively by said first and second wheels; a first multiplier circuit means coupled to receive said first wheelspeed signal and said first brake torque signal, and producing a first brake energy signal; a second multiplier circuit means coupled to receive said second wheelspeed signal and said second brake torque signal, and producing a second brake energy signal; a first integrator circuit means coupled to receive said first brake energy signal and producing a first brake energy integral signal; a second integrator circuit means coupled to receive said second brake energy signal and producing a second brake energy integral signal; summer coupled to receive said first and second brake energy integral signals, and producing a brake energy error signal representing the difference between the said received signals; in said summer if the brake energy of the first wheel is greater than that of the second wheel, then the sign of the brake energy error signal will be negative, if the brake energy of the second wheel is greater than the brake energy of the first wheel, then the brake energy error signal will be of a positive sign; saturated amplifier means coupled to the signal output from said summer for producing either a step output signal of a fixed amplitude and negative value for a positive sign brake energy error signal input, or a step output signal of a fixed amplitude and negative value for a negative sign brake energy error signal input; integrator means coupled to the signal output from said circuit means for producing a brake energy control signal to modulate said system deceleration control signal to said first wheel braking means, such that when the brake energy of said first wheel braking means is greater than the brake energy of the second wheel, there will be no signal output from block to integrator and therefore no system deceleration control signal change to said first wheel braking means, and when the brake energy of said first wheel braking means is less than the brake energy of the second wheel, there will be a step output signal of a fixed amplitude negative value from block to integrator and hence an increase in the system deceleration control signal to said first wheel braking means for increasing the brake pressure.

42. In a limited-slip brake control system for a multi-wheeled vehicle having wheel braking means, said system comprising: means for providing first and second wheelspeed signals representative of the rotational velocities of a first and a second wheel; differentiator means for producing respectively first and second wheel deceleration signals representative of the rate of rotational deceleration of each of said wheels; selector means for providing a reference signal representative of a predetermined rate of wheel deceleration; a basic deceleration control circuit coupled to the outputs from said differentiator means and said selector means, for producing a basic brake control signal to maintain the wheel deceleration rate at the level provided by said selector means; a large deviation control circuit coupled to said differentiator means and to said selector means, for providing an exponentially increasing output signal causing a rapid decrease in the wheel braking effort when activated by a predetermined increase in the wheel deceleration signal over that of the selected deceleration signal, and for providing an exponentially decreasing output signal to gradually return control of the wheel braking effort to said basic deceleration control circuit; summing means for combining the output signals from said basic deceleration control circuit and producing a system output signal; and a brake energy balance system for modulating said system deceleration control signal between said first and second wheels to equalize the braking work load.

43. The brake control system as set forth in claim 42, wherein said basic deceleration control circuit comprises: comparator means for providing a signal proportional to the difference between said predetermined deceleration signal from said selector means and said wheel deceleration signal from said differentiator means; threshold circuit means coupled to the output from said comparator means for producing a trigger signal when said comparator means output signal exceeds a predetermined level; single-shot multivibrator means coupled to the output from said threshold circuit means for producing a constant amplitude, constant duration pulse; and integrator means coupled to the output from said single-shot multivibrator means for producing a rapid decrease in braking effort for the duration of said pulse from said single-shot multivibrator means and for producing a gradual increase in braking effort in the absence of said pulse from said single-shot multivibrator means.

44. The brake control system as set forth in claim 42, further including: a selector deceleration control circuit interposed between said basic deceleration control circuit and said large deviation control circuit for automatically adjusting the representative rate of rotational deceleration of the reference signal downwards when the road surface conditions will not permit the vehicle to achieve the selected deceleration rate without tire skid.

45. The brake control system as set forth in claim 44, wherein said selector deceleration control circuit comprises: amplifier means for providing a step-signal output when said large deviation control circuit is activated; time constant means coupled to the output from said amplifier means for providing an exponentially increasing and decreasing signal; and summer means for coupling said time constant output signal to said selector switch signal resulting initially in a substantial decrease in the strength of the reference signal reaching said summer when said large deviation control is deactivated.

46. A percent-slip brake control system for limiting the application of braking torque to wheels of a vehicle having wheel braking means, such that the tire frictional force remains within the non-slip portion of the characteristic Mu/slip curve, said system comprising: differentiator means for producing first and second wheel deceleration signals from first and second wheel-speed signals proportional to the rotational velocities of each wheel; selector means for providing a reference signal representative of a predetermined percent-slip range within which the wheel is to operate in order that an adequate margin of tire frictional force remains for directional steering control; a basic deceleration control circuit coupled to the signal outputs from said differentiator means and said selector means for producing a basic wheel braking control signal to maintain the rate of wheel deceleration at the level of said reference signal; a large deviation control circuit coupled to the signal outputs from said differentiator means and said selector means for providing a corrective backup control action to quickly reduce wheel braking effort when activated by a wheel suddenly entering a skid condition; summing means coupled to the signal outputs from said basic deceleration control circuit and said large deviation control circuit for combining their signal outputs and producing a system output signal to control the wheel braking effort; said large deviation control circuit being activated by a wheel deceleration signal exceeding the selected deceleration reference signal by a predetermined step-increase amount, and producing an exponentially increasing signal output to said summing means for causing a rapid decrease in the wheel braking effort; said large deviation control circuit being deactivated by a wheel deceleration signal decreasing below said predetermined step-increase of the selected reference signal, thereby producing an exponentially decreasing signal output to said summing means for gradually returning control of the wheel braking effort to said basic deceleration control circuit; a brake energy balance system for modulating said system deceleration control signal between said first and second wheels to equalize the braking work load; said brake energy balance system comprising: means for producing a first and a second brake torque signal representative of the braking work load applied respectively by said first and second wheels; a first multiplier circuit means coupled to receive said first wheelspeed signal and said first brake torque signal, and producing a first brake energy signal; a second multiplier circuit means coupled to receive said second wheelspeed signal and said second brake torque signal, and producing a second brake energy signal; a first integrator circuit means coupled to receive said first brake energy signal and producing a first brake energy integral signal; a second integrator circuit means coupled to receive said second brake energy signal and producing a second brake energy integral signal; summer coupled to receive said first and second brake energy integral signals, and producing a brake energy error signal representing the difference between the said received signals; saturated amplifier means coupled to the signal output from said summer for producing a step output signal; integrator means coupled to receive said step output signal from said saturated amplifier means for producing a brake energy control signal to modulate said system deceleration control signal for equalizing the braking work load between said first and said second wheels.

47. The brake control system as set forth in claim 46, wherein said basic deceleration control circuit comprises: comparator means for providing a signal proportional to the difference between said predetermined deceleration signal from said selector means and said wheel deceleration signal from said differentiator means; threshold circuit means coupled to the output from said comparator means for producing a trigger signal when said comparator means output signal exceeds a predetermined level; single-shot multivibrator means coupled to the output from said threshold circuit means for producing a constant amplitude, constant duration pulse; and integrator means coupled to the output from said single-shot multivibrator means for producing a rapid decrease in braking effort for the duration of said pulse from said single-shot multivibrator means and for producing a gradual increase in braking effort in the absence of said pulse from said single-shot multivibrator means.

48. The brake control system as set forth in claim 46, further including: a selector deceleration control circuit interposed between said basic deceleration control circuit and said large deviation control circuit for automatically adjusting the representative rate of rotational deceleration of the reference signal downwards when the road surface conditions will not permit the vehicle to achieve the selected deceleration rate without tire skid.

49. The brake control system as set forth in claim 48, wherein said selector deceleration control circuit comprises: amplifier means for providing a step-signal output when said large deviation control circuit is activated; time constant means coupled to the output from said amplifier means for providing an exponentially increasing and decreasing signal; and summer means for coupling said time constant output signal to said selector switch signal resulting initially in a substantial decrease in the strength of the reference signal reaching said summer when said large deviation control is deactivated.

50. In a limited-slip brake control system for a multi-wheeled vehicle having wheel braking means, said system comprising: means for providing first and second wheelspeed signals representative of the rotational velocities of a first and a second wheel; differentiator means for producing respectively first and second wheel deceleration signals representative of the rate of rotational deceleration of each of said wheels; selector means for providing a reference signal representative of a predetermined rate of wheel deceleration; a basic deceleration control circuit coupled to the signal outputs from said differentiator means and said selector means, for producing a basic wheel braking control signal to maintain the wheel deceleration rate at the level of said reference signal; said basic deceleration control circuit comprising: summing means for combining said first and second wheel deceleration signals; averaging means for producing an average wheel deceleration signal from said summed wheel deceleration signals; means for comparing said average wheel deceleration signal to said reference signal and producing a wheel deceleration error signal; a hysteresis circuit for receiving said wheel deceleration error signal and producing a constant level positive or negative signal depending upon the sign of said wheel deceleration error signal; means for integrating said hysteresis circuit output signal and producing said basic wheel braking control signal; a large deviation control circuit coupled to the signal outputs from said differentiator means and said selector means for providing a corrective backup control action to quickly reduce wheel braking effort when activated by a wheel suddenly entering a skid condition; summing means coupled to the signal outputs from said basic deceleration control circuit and said large deviation control circuit for combining their signal outputs and producing a system output signal to control the wheel braking effort; said large deviation control circuit being activated by a wheel deceleration signal exceeding the selected deceleration reference signal by a predetermined step-increase amount, and producing an exponentially increasing signal output to said summing means for causing a rapid decrease in the wheel braking effort; said large deviation control circuit being deactivated by a wheel deceleration signal decreasing below said predetermined step-increase of the selected reference signal, thereby producing an exponentially decreasing signal output to said summing means for gradually returning control of the wheel braking effort to said basic deceleration control circuit; a brake energy balance system for modulating said system deceleration control signal between said first and second wheels to equalize the braking work load; said brake energy balance system comprising: means for producing a first and a second brake torque signal representative of the braking work load applied respectively by said first and second wheels; a first multiplier circuit means coupled to receive said first wheelspeed signal and said first brake torque signal, and producing a first brake energy signal; a second multiplier circuit means coupled to receive said second wheelspeed signal and said second brake torque signal, and producing a second brake energy signal; a first integrator circuit means coupled to receive said first brake energy signal and producing a first brake energy integral signal; a second integrator circuit means coupled to receive said second brake energy signal and producing a second brake energy integral signal; summer coupled to receive said first and second brake energy integral signals, and producing a brake energy error signal representing the difference between the said received signals; saturated amplifier means coupled to the signal output from said summer for producing a step output signal; integrator means coupled to receive said step output signal from said saturated amplifier means for producing a brake energy control signal to modulate said system deceleration control signal for equalizing the braking work load between said first and said second wheels.

51. The brake control system as set forth in claim 50, further including: a selector deceleration control circuit interposed between said basic deceleration control circuit and said large deviation control circuit for automatically adjusting the representative rate of rotational deceleration of the reference signal downwards when the road surface conditions will not permit the vehicle to achieve the selected deceleration rate without tire skid.

52. The brake control system as set forth in claim 50, wherein said selector deceleration control circuit comprises: amplifier means for providing a step-signal output when said large deviation control circuit is activated; time constant means coupled to the output from said amplifier means for providing an exponentially increasing and decreasing signal; and summer means for coupling said time constant output signal to said selector switch signal resulting initially in a substantial decrease in the strength of the reference signal reaching said summer when said large deviation control is deactivated.

53. A method for limiting the application of braking torque to wheels of a vehicle having wheel braking means, such that the tire to runway frictional forces remain within the non-slip portion of the characteristic Mu/slip curve, comprising the steps of: generating a wheel deceleration signal representative of the rate of deceleration of the wheels of the vehicle from a signal proportional to the rotational velocity of a wheel; selecting a reference signal representative of a predetermined rate of vehicle deceleration for maintaining the ground frictional force of the tire on the non-slip of the characteristic Mu/slip curve; producing a first brake control signal for maintaining the rate of vehicle deceleration at the selected level, from a comparison of said reference signal with said differentiated signal within a basic deceleration control circuit; generating a second brake control signal to quickly reduce wheel braking effort when a large deviation control circuit is activated by a predetermined increase in the wheel deceleration signal over that of the selected reference signal such as by the wheel suddenly being forced into a skid condition; summing said first and second brake control signals, and producing a system output signal for controlling the wheel braking effort; said generating second brake control signal being of an exponentially increasing signal output for causing a rapid decrease in the wheel braking effort when said wheel deceleration signal exceeds the selected deceleration reference signal by a predetermined step-increase amount; and said second brake control signal being of an exponentially decreasing signal output for causing a gradual control of the wheel braking effort to the basic deceleration control circuit when said wheel deceleration signal decreases below said predetermined step-increase of the selected deceleration reference signal.

* * * * *

UNITED STATES PATENT AND TRADEMARK OFFICE
CERTIFICATE OF CORRECTION

PATENT NO. : 4,078,845

DATED : March 14, 1978

INVENTOR(S) : Robert Leo Amberg, et al.

It is certified that error appears in the above-identified patent and that said Letters Patent are hereby corrected as shown below:

Column 17, lines 65-66: "vehicle" is changed to --the aircraft--.

Column 19, line 23: --output-- is inserted after "constant".

Column 19, line 28: --the-- is inserted before "wheels".

Column 29, line 1: "consistant" is changed to --consistent--.

Column 30, line 11: "of" is changed to --to--.

Column 31, line 14: --means-- is inserted after "selector".

Column 31, line 62: "conprising" is changed to --comprising--.

Column 31, line 66: the comma "," after "respectively" is deleted.

Column 37, line 5: --side-- is inserted after "non-slip".

Signed and Sealed this

Fifteenth Day of August 1978

[SEAL]

Attest:

RUTH C. MASON
*Attesting Officer*

DONALD W. BANNER
*Commissioner of Patents and Trademarks*